United States Patent
Challa et al.

(10) Patent No.: US 12,079,206 B2
(45) Date of Patent: Sep. 3, 2024

(54) TRANSMITTING CHANGE DATA CAPTURE EVENTS DURING DATABASE REPLICATION

(71) Applicant: Salesforce, Inc., San Francisco, CA (US)

(72) Inventors: Narsimha Reddy Challa, Hyderabad (IN); Swaroop Jayanthi, Hyderabad (IN); Komalapriya J, Rajapalayam (IN); Ramalinga Raju Kalidindi, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/091,313

(22) Filed: Dec. 29, 2022

(65) Prior Publication Data
US 2024/0220484 A1 Jul. 4, 2024

(51) Int. Cl.
G06F 16/23 (2019.01)
G06F 16/27 (2019.01)

(52) U.S. Cl.
CPC ........ G06F 16/2386 (2019.01); G06F 16/273 (2019.01)

(58) Field of Classification Search
CPC .................. G06F 16/2386; G06F 16/273
See application file for complete search history.

(56) References Cited

U.S. PATENT DOCUMENTS

| | | | |
|---|---|---|---|
| 11,120,047 B1* | 9/2021 | Hoffmann | G06F 16/275 |
| 11,232,000 B1* | 1/2022 | Bhatia | G06F 11/1464 |
| 11,500,893 B2 | 11/2022 | Patil et al. | |
| 11,609,928 B2 | 3/2023 | Jayanthi | |
| 11,698,894 B2 | 7/2023 | Varley et al. | |
| 11,803,568 B1* | 10/2023 | Jain | G06F 16/2282 |
| 2015/0032694 A1* | 1/2015 | Rajamani | G06F 16/2358 707/625 |
| 2019/0171650 A1* | 6/2019 | Botev | G06F 16/2358 |
| 2022/0269694 A1* | 8/2022 | Burnett | G06F 16/2358 |
| 2023/0128784 A1* | 4/2023 | Zeltwanger | G06F 16/27 714/3 |
| 2023/0401230 A1 | 12/2023 | Vissapragada et al. | |

* cited by examiner

Primary Examiner — Dangelino N Gortayo

(57) ABSTRACT

An online system performs replication of database from one system to another. A source database is replicated to a target database by performing an initial bulk copy followed by repeated change data capture. The system performs batching to group events generated by the change data capture events. The system performs a multi-constrained analysis to determine when a batch is ready for sending. The system uses multiple buffers for transmitting events to decouple the receiving and sending of events. The online system may be a multi-tenant system the source and target databases stores data of tenants. The system determines a tenant score to adjust the resources allocated during event transfer. The system splits an event into partial events, to avoid dependency between the partial events so that tasks can be executed independent of each other. Therefore, the system performs replication with reduced synchronization overhead.

20 Claims, 16 Drawing Sheets

400

TRANSMITTING CHANGE DATA CAPTURE EVENTS DURING DATABASE REPLICATION

BACKGROUND

Field of Art

This disclosure relates in general to replication of databases and more specifically to efficient transmission of change data capture events during database replication.

Description of the Related Art

Online systems store data of in a database, for example, multi-tenant systems store data of tenants in a database that is shared across tenants. Enterprises often require copying of data stored in databases, for example, for migrating data of a tenant from one database to another database. A tenant may migrate from one database to another database for various reasons, for example, if the current database has reached its capacity, if the tenant is migrating to a cloud platform, or for compliance reasons. Copying of a database involves making a bulk copy followed by a change data capture phase in which changes made by the source database system are sent to the target database system. The bulk copy of the data is a slow process that can take several days, depending on the size of the database being copied. Inefficient execution of the changed data capture phase results in excessive consumption of computing and network resources.

Figure 1:
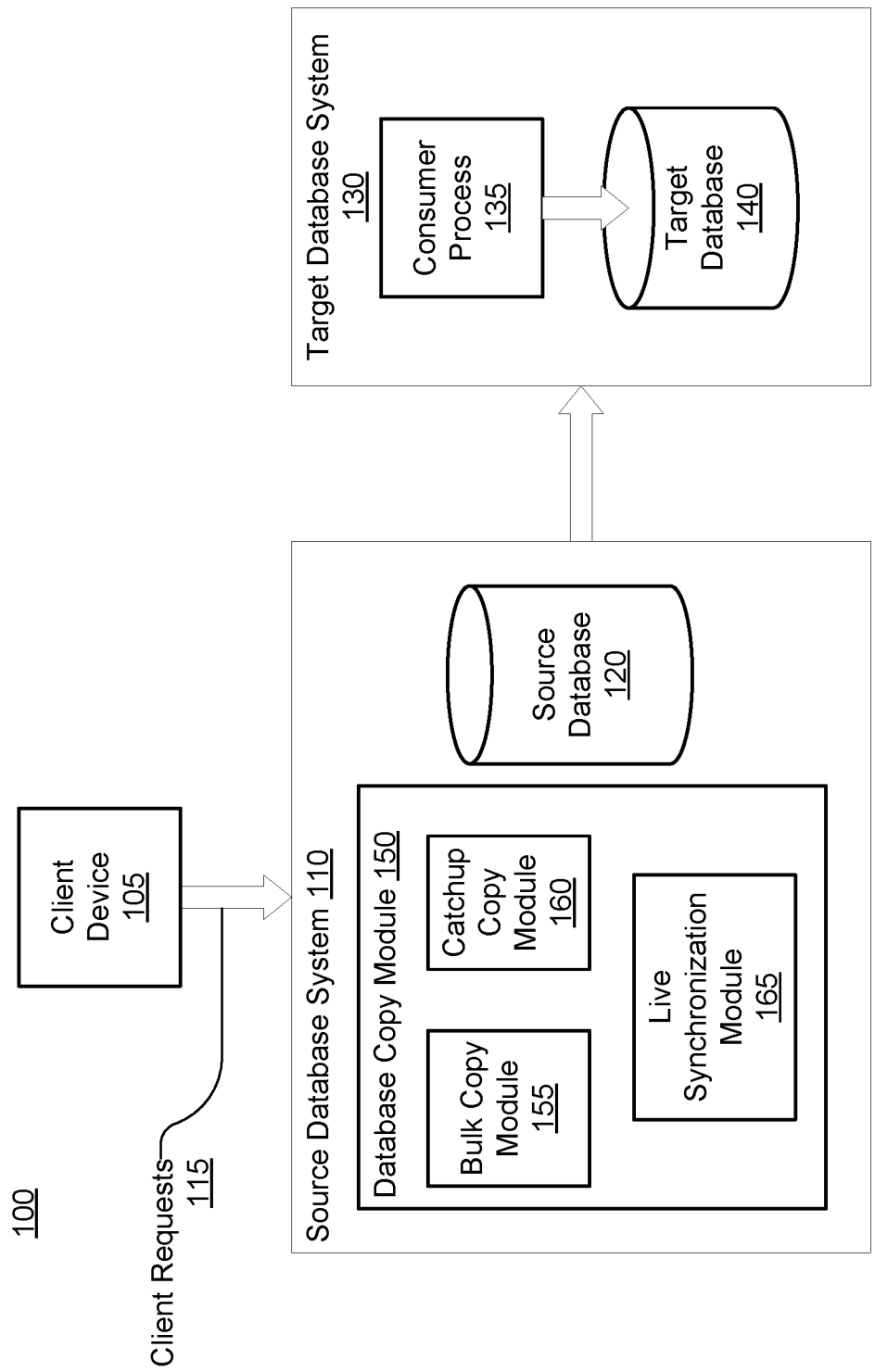
FIG. 1 is a block diagram of a system environment illustrating copying of data stored in a database from a source database system to a target database system, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

An online system performs replication of database from one system to another. A source database is replicated to a target database by performing an initial bulk copy followed by repeated change data capture. There may be frequent transactions in the source database resulting in frequent change data capture events being sent to the target database. This results in inefficient replication due to overhead created by frequent data transfer. The system performs batching to group events generated by the change data capture events. The system performs a multi-constrained analysis to determine when a batch is ready for sending. The system is configurable and uses an ordered set of constraints. For each event that is received, the constraints are evaluated in order. If any constraint fails, the batch is closed, and data sent to the target database. If none of the constraints fail, the system keeps adding events to the batch.

The system according to an embodiment uses multiple buffers for transmitting change data capture streams. A set of empty buffers are initialized. A buffer is selected for storing events. As events are received from the source database, the events are added to the selected buffer. When the buffer reaches capacity, another empty buffer is selected. A buffer transmitter selects a full buffer for transmitting data to the target database. The buffer transmitter keeps selecting the oldest buffer and transmitting the data to the target database. The use of multi-buffer decouples the receiving and sending of events and removes the synchronization overhead. Furthermore, the system may use multiple threads to receive and populate multiple buffers or transfer data from multiple buffers in parallel.

In an embodiment, the online system is a multi-tenant system and each database from the primary and secondary sets of databases stores data of a plurality of tenants. According to an embodiment, the system uses multiple buffers to transmit change data streams for database replication. In a multi-tenant system, different tenants may have different amount of data that needs to be transmitted. The system manages multiple approaches based on requirements of different tenants in a multi-tenant system. The system performs batching to group events generated by the change data capture events and uses multiple buffers to transmit the data for multiple tenants. The system creates multiple event transmitters, one per tenant. An event transmitter is paired with a destination event consumer. A tenant score is computed at the end of each batch completion based on various metrics based on events received, e.g., statistics describing LOB (large object) data events and non-LOB data events. The system adjusts the resources allocated during event transfer based on scores determined for each tenant.

When replicating a source database to a target database, change data capture events are generated representing changes in the source database. An event has multiple attributes that are used by different subsystems, for example, a subsystem for generating metrics, a subsystem for performing data transmission, and so on. The dependency of an event on multiple subsystems causes synchronization overhead since a subsystem gets blocked if the remaining subsystems do not complete processing. The system as disclosed allows asynchronous processing of tasks based on events. This results in decoupling of tasks and reduces synchronization overhead. The system splits an event into partial events, each partial event including a subset of attributes of the event. Accordingly, the attributes of an event are divided such that there is no dependency between the partial events and the tasks can be executed independent of each other. A data flow analysis may be performed to determine how to split the attributes of the event, for example, to determine which attributes of the event are processed by a particular subsystem so that the event can be split accordingly.

Overall System Environment

FIG. 1 is a block diagram of a system environment illustrating copying of data stored in a database from a source database system to a target database system, according to one embodiment. The system environment 100 comprises a source database system 110, a target database system 130, and one or more client devices 105. In other embodiments, the system environment 100 may include other more or fewer components, for example, there may be third party systems that interact with the online system 110. The term system used herein refers to the overall system environment and may include modules that execute in the source database system 110 or the target database system 130. The system creates a point-in-time consistent copy of a database of the source database system 110 in the target database system 130. The system creates a copy of the database by a bulk copy of data and sending a change data stream of transactions executed in the source database system to the target database system. The bulk copy phase is also referred to herein as the cloning phase. A transaction represents changes performed to one more database tables. Although embodiments are described using terminology of relational databases, the techniques described may be applied to other types of database systems, for example, document-based database systems, NOSQL database systems, graph database systems, and so on.

The system according to an embodiment, performs heterogeneous copies of database, for example, a copy of a database implemented using a particular database architecture to a database implemented using a different architecture. The system also performs a copy of database provided by one database vendor to a database provided by another database vendor, for example, the source database system may be an ORACLE database and a target database system may be MYSQL database or a POSTGRES database system. A database vendor may also be referred to herein as a database provider.

The source database system 110 includes a source database 120 and a database copy module 150. The target database system 130 includes a target database 140 and a consumer process 135 that may be executed by a consumer module. A database, for example, the source database 120 or the target database 140 stores data and may allow users to perform database operations including queries that access data as well as database commands that modify the data. For example, the database may store records comprising fields and a query may insert new records, update existing records, and delete records. A query may request fields of records. For a multi-tenant system, the database may store data for multiple enterprises, each enterprise representing a tenant of the multi-tenant system.

A database processes queries to process data stored in database. In an embodiment, the database processes queries in a particular query language, for example, structured query language (SQL). A query may be used to perform an action using the database, for example, update a record, add new record, or delete a record. The query may be used to access information, for example, values stored in one or more records.

The source database system 110 and the target database system 130 may include other modules than those shown in FIG. 1. Functionality indicated as being performed by a particular module as described herein may be performed by other modules. Furthermore, although the database copy module 150 is shown as part of the source database system, in other embodiments, the database copy module 150 may be part of another system or various modules within the database copy module 150 may be part of different systems. The processes described herein may be used for data migration, for example, for migrating data or applications. The system may migrate data from one version of a database system to another version of a database system. The system may migrate from a particular type of database to another type of database, for example, from database provided by a particular database vendor to a database provided by another database vendor. The system according to various embodiment, performs data migration that deliver a point in time consistent copy to the target database system that may be used for various testing scenarios.

The database copy module 150 comprises a bulk copy module 155, a catchup copy module 160, and a live synchronization module 165. The database copy module 150 may also be referred to herein as a data synchronization service. These modules execute various steps of a database copy process as shown in FIG. 2.

Figure 2:
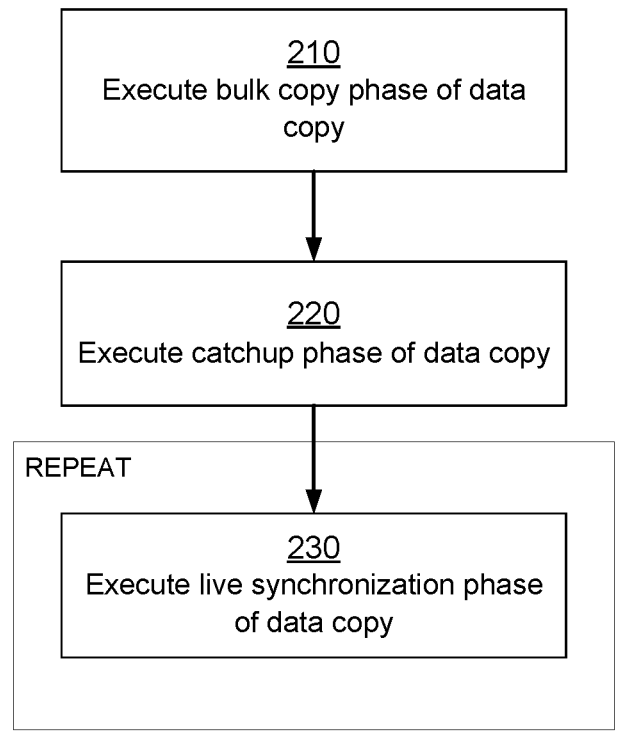
FIG. 2 is a flow chart illustrating the process for copying of data stored in a database from a source database system to a target database system, according to one embodiment.

FIG. 2 is a flow chart illustrating the process for copying of data stored in a database from a source database system 110 to a target database system 130, according to one embodiment. Steps shown in FIG. 2 may be executed by modules different from those indicated herein. Various embodiments can perform the steps of the processes in different orders than those indicated herein. Moreover, other embodiments can include different and/or additional steps than the ones described herein.

The bulk copy module 155 executes 210 a bulk copy phase that performs a bulk copy of the data stored in the source database system 110 to the target database system 130. During the bulk copy phase, the database records are copied from source database system to the target database system. This can be a long running process that could take hours or days to execute. As a result, during the bulk copy phase, the data of the source database 120 may change. The system copies the changes that occur using a change data stream. The change data stream is sent by the database copy module 150 to the target database system and processed by the consumer process 135 that receives the change data stream, analyzes the change data stream to identify the database operations corresponding to the transactions represented by the change data stream and applies the database operations to the target database 140. According to an embodiment, the change data stream comprises an ordered stream of transactions as they are committed on the source database. Each transaction has a commit time representing the time that the transaction was committed on the source database system.

According to an embodiment, the system executes change data capture (CDC) that refers to the process of identifying and capturing changes made to data in a database and then delivering those changes in real-time as a change data stream to a downstream process or system. According to an embodiment, the system extracts transaction logs of the source database system and generates the change data stream based on the transaction logs. According to an embodiment, the system sends database operations in the change data stream. These operations are executed on the target database system to reflect the changes performed in the source database system.

The catchup copy module 160 executes 220 a catchup phase of data copy. During the catchup phase, the changes that occurred in the source database 120 during the bulk copy phase are applied to the target database 140. The catchup phase brings the target database 140 to a transactionally consistent state. However, if the source database system 110 is a production system, the data stored in the source database 120 may keep getting modified as a result of ongoing transactions, for example, transactions performed as a result of client requests 115 received from client devices 105.

The live synchronization module 165 repeatedly executes 230 the live synchronization phase of data copy. During the live synchronization phase, the changes occurring on the source database 120 are continuously applied to the target database 140. In this phase the system ensures that the target database 140 is in a point-in-time consistent state with respect to the source database 120.

In some embodiments, the source database system 110 is part of a multi-tenant system. Each tenant may be an enterprise. Each tenant may represent a customer of the multi-tenant system that has multiple users that interact with the multi-tenant system via client devices.

A multi-tenant system stores data for multiple tenants in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system may execute an application server that simultaneously processes requests for a number of tenants. However, the multi-tenant system enforces tenant-level data isolation to ensure that jobs of one tenant do not access data of other tenants.

The source database 120 stores database records representing data that is processed by the source database system 110. In embodiments where the source database system is part of a multi-tenant system, the source database 120 stores data for various tenants of the multi-tenant system. The source database 120 may store data for different tenants in separate physical structures, for example, separate database tables or separate databases. Alternatively, the source database 120 may store data of multiple tenants in a shared structure. For example, user accounts for all tenants may share the same database table. However, the multi-tenant system stores additional information to logically separate data of different tenants. In embodiments that implement a multi-tenant system, the system and processes described herein allow copy of data for a particular tenant from the source database system 110 to the target database system 130.

In one embodiment, the source database system 110 is part of a multi-tenant system that implements a web-based customer relationship management (CRM) system and an application server that provides users access to applications configured to implement and execute CRM software applications.

The client device 105 comprises a user interface that may be provided by an application executing on the client device 105, for example, a browser application. A user may use the user interface to interact with the online system 110. For example, the user may execute an application in connection with an interaction with one or more other users to complete a transaction.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the system architecture and the processes described herein are illustrated using a multi-tenant system, the techniques disclosed are not limited to multi-tenant systems but can be executed by any online system, for example, an online system used by a single enterprise. Furthermore, the method disclosed in this document is not only applicable to database replication technologies but applicable to any system that processes a large number of events and transmits them.

Figure 3:
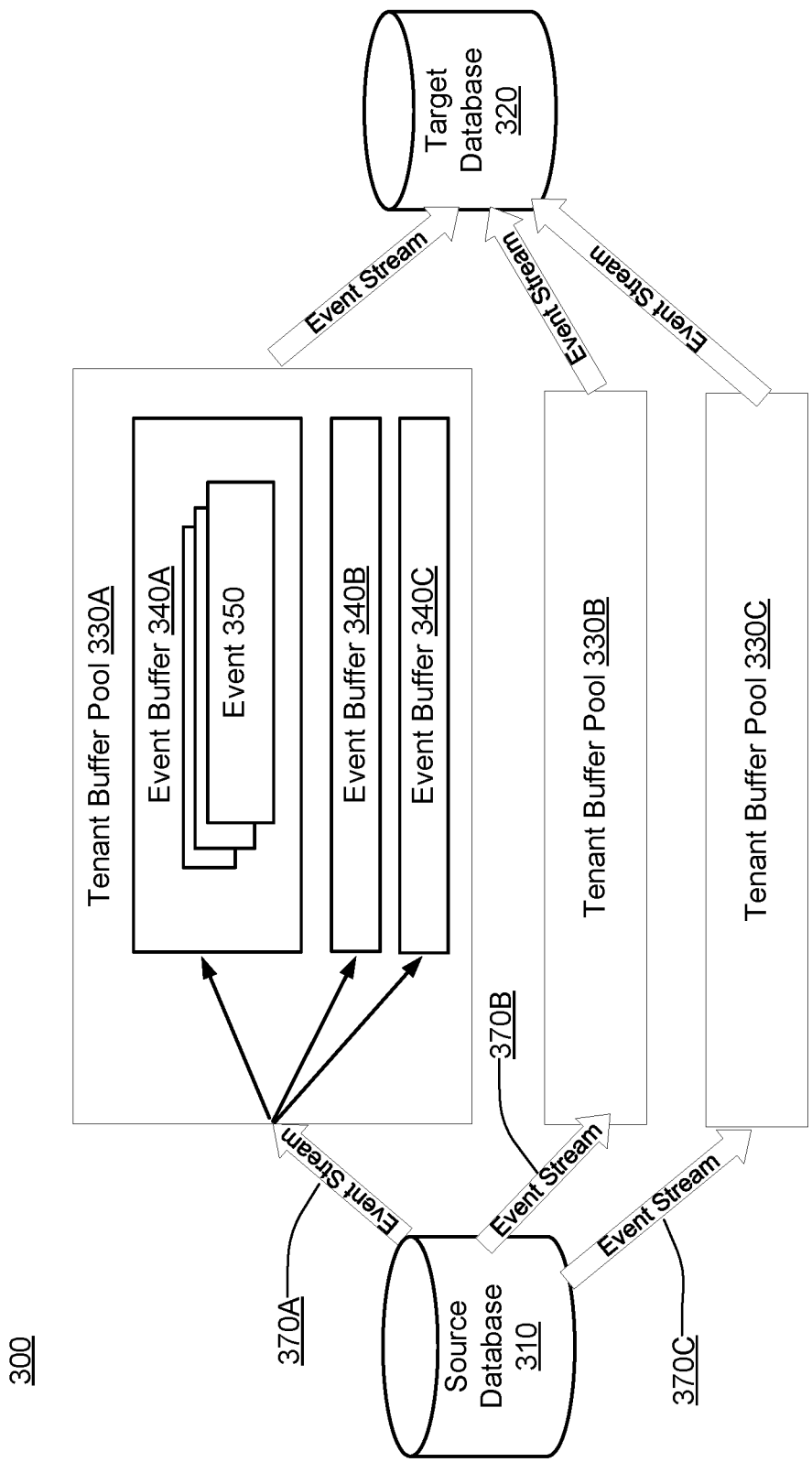
FIG. 3 is a block diagram of a system environment illustrating replication of a source database to a target database, according to one embodiment.

FIG. 3 is a block diagram of a system environment 300 illustrating replication of a source database to a target database, according to one embodiment. The data of the source database 310 is replicated the target database 320 using multiple event streams. Each event stream transmits events representing changes performed in the source database, for example, by executing DML statements. According to an embodiment, the source database 310 stores data for a multi-tenant system. The system uses multiple tenant buffer pools 330A, 330B, 330C, and so on. Each tenant buffer pool 330A, 330B, 330C represents a buffer pool for a tenant of the multi-tenant system and process an event stream 370A, 370B, 370C. An event stream is also referred to herein as a change data stream or change data capture stream. A tenant buffer pool, for example, tenant buffer pool 330A includes multiple event buffers, for example, event buffers 340A, 340B, 340C, and so on. An Event buffer, for example, event buffer 340A may store multiple events 350 before the events are transmitted to the target database 320.

Multi-Constraint Analysis for Batching Events During Database Replication

Typically, during database replication, a system performs an initial data copy from the source database to a target database up to a certain transaction. This initial data copy is followed by a catchup phase to capture the events for the data changed during the initial data copy was in progress. Once, the catchup phase is completed, there is a live synchronization phase (also referred to as change data capture (CDC)) for capturing the events corresponding to the live data changes happening at the source database. This is continued until both the source database and the target database(s) become synchronized and data integrity is achieved.

Figure 4:
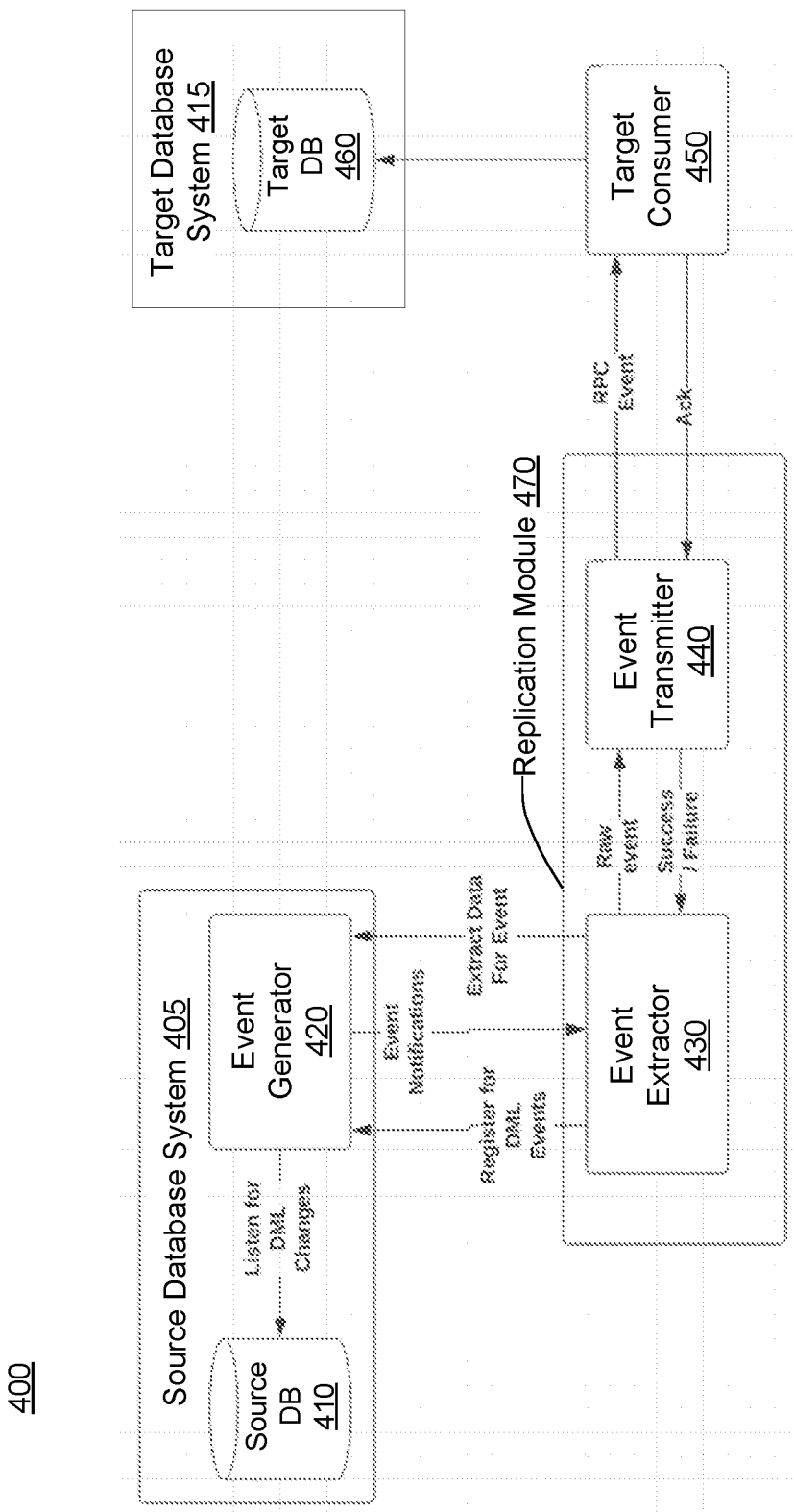
FIG. 4 is a block diagram illustrating the system environment including a replication module for performing database replication, according to an embodiment.

FIG. 4 is a block diagram illustrating the system environment 400 including a replication module for performing database replication, according to an embodiment. The data from source database 410 of the source database system 405 is replicated to a target database 460 of the target database system 415. The event generator 420 listens to database commands, for example, DML (data manipulation language) commands executed by the source database 410.

The replication module 470 includes an event extractor 430 and an event transmitter 440. The event extractor 430 extracts events representing changes performed in the data stored in the source database 410. The event extractor 430 may run as a part of the source database system 405 or as an independent system. The event generator 420 provides an API (application programming interface) endpoint/callback which is invoked by the replication module 470 to receive event notifications. This process is repeated for each event.

The system may serialize the events one by one and the extraction process processes these events in the same order. After receiving an event, the event transmitter 440 transmits the event to a target consumer 450 over the network. The target consumer 450 applies the event to the target database 460. Thus, the time spent for processing an event during replication is the sum of following terms: (1) time spent in extraction from the source database, (2) time for event transformation as per the target database, and (3) time spent in transmission to the target consumer 450.

If the extraction of events from the source database is faster and the network transmission speeds are slower (due to network latencies), then the database replication process is slowed down. Network communication is often the bottleneck in database replication. In general, if the extraction and transmission of events are performed by the same process, for a typical event, 50% to 80% of the time is spent in transmission over the network.

In some embodiments, the system caches multiple events and sends them to the target consumers. The system uses an efficient and scalable approach to determine how many events to cache at a time. This is challenging because different DML events have different memory requirements making it challenging to estimate the cache requirement for a given set of events. Another challenge to caching is, determining the length of time to wait for caching the events before the batch is transmitted. This is so because if the incoming event rate is low, then waiting for a predetermined number of events may take a long time and may slow down the replication process.

To address the performance issues described above, the system according to various embodiments dynamically creates batches of events based on multiple constraints. The system further uses continuous feedback regarding future batch size. The system applies constraints in a priority order to create batches of events. Also, the system separates the extraction and transmission processes with multiple shared buffers.

Figure 5:
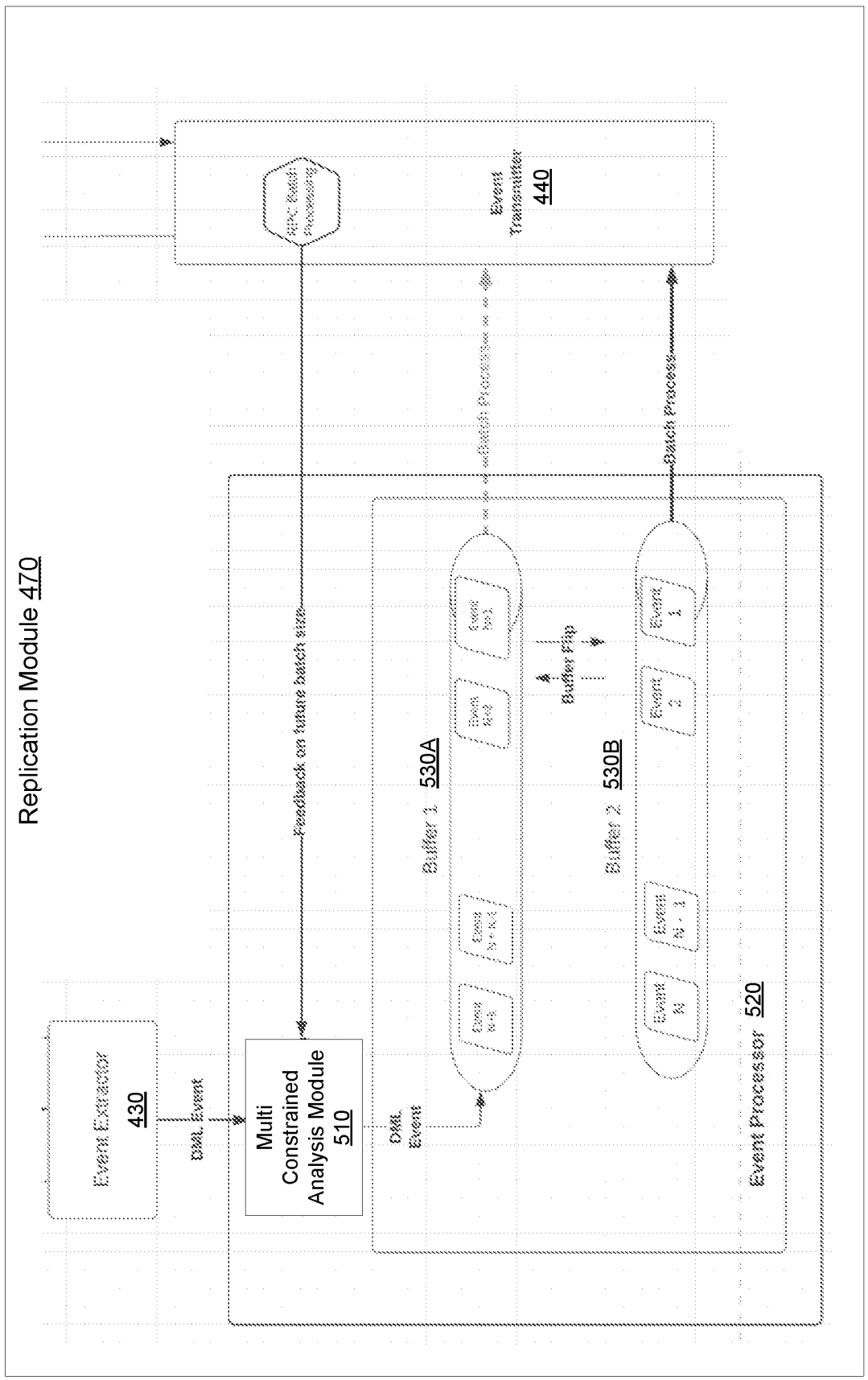
FIG. 5 is a block diagram illustrating the system architecture of a replication module for performing multi-constrained based event batching for database replication, according to an embodiment.

FIG. 5 is a block diagram illustrating the system architecture of a replication module for performing multi-constrained based event batching for database replication, according to an embodiment. The process is described using events generated by changes to a source database but the input to the replication module can be provided by any source of events. The event extractor 430 extracts events, for example, change data capture events from the source database. The event processor 520 processes the received change data capture events and enqueues them into a processing queue. The event transmitter 440 transmits the events from the processing queue to the target database over a network, for example, via a communication channel such as an RPC (remote procedure call) channel. The target consumer 450 receives the events over the communication channel for consumption. The target consumer 450 may perform some data conversions if needed by the target database and transfers them over a data bus to its consumers, for example, the target database. The target consumer 450 may further cache the events until a downstream consumers request the events. The target consumer 450 may update the target database by applying the events to the target database. The multi-constrained analysis module 510 evaluates a set of prioritized constraints in an order determined based on their priority to determine whether an incoming event should be added to a batch, or the batch should be completed, and the events of the batch sent to the target consumer. The prioritized constraints may be represented as expressions based on attributes describing change data capture events. The event processor 520 may include multiple buffers 530A, 530B that store events. The system may use one buffer, e.g., buffer 530B for transmitting events to the target consumer while the other buffer, e.g., buffer 530A is used for receiving events. Periodically the system switches the roles of the buffers, for example, after some time the system starts using the buffer 530A for transmitting events while incoming events are stored in buffer 530B.

According to an embodiment, an event extractor 430 runs either as a surrogate process or an independent process by itself. In the case the event extractor 430 runs as a surrogate process, the source database may provide certain mechanisms, such as callbacks for registration and event dispatch based on DML operations. If there are any changes to the source database caused by DML operations, the source database dispatches corresponding events to all registered event extractors 430.

Figure 6:
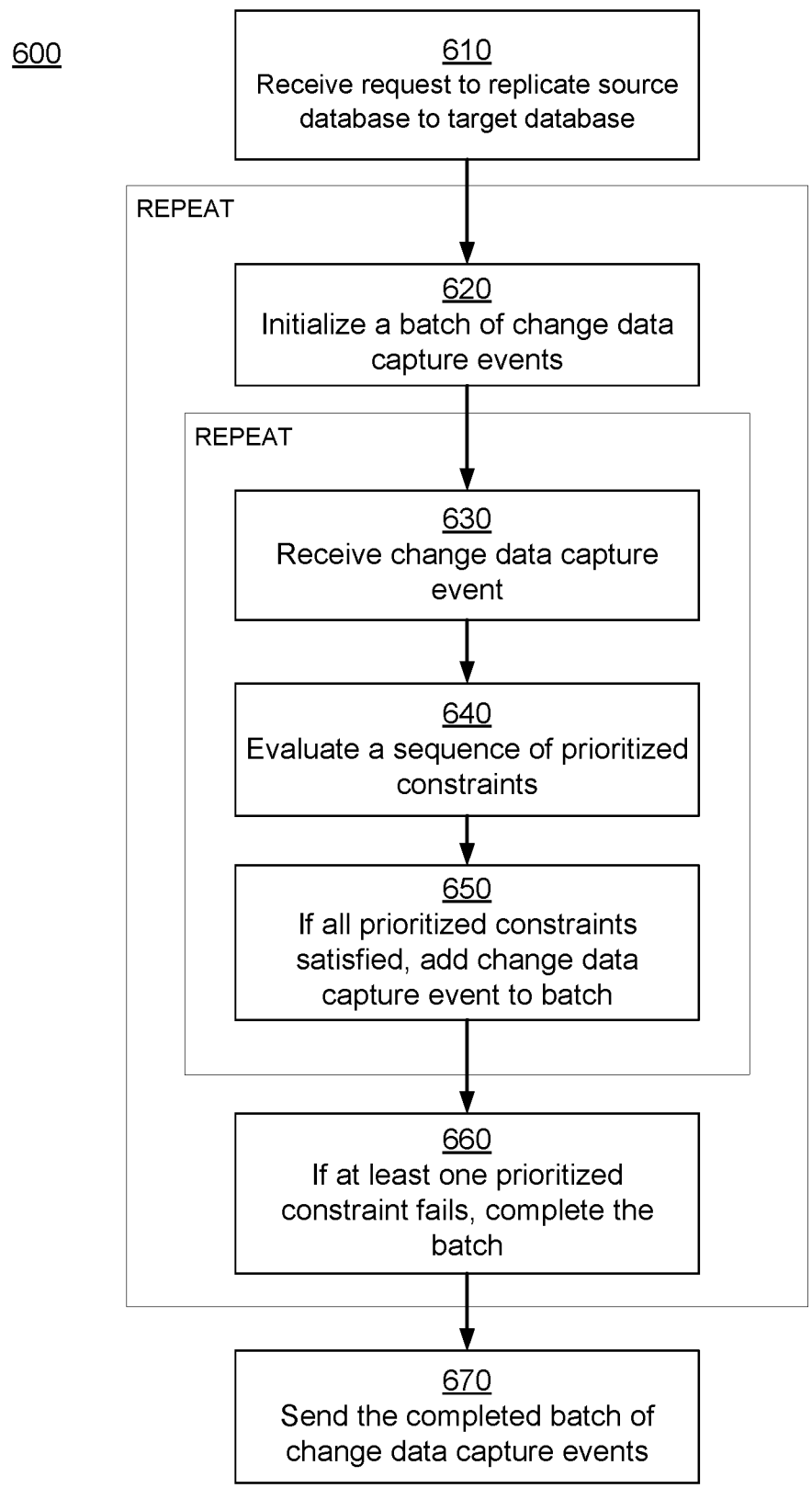
FIG. 6 is a flow chart illustrating the process for performing multi-constrained based event batching, according to one embodiment.

FIG. 6 is a flow chart illustrating the process 600 for performing multi-constrained based event batching, according to one embodiment.

The system receives 610 a request to replicate the source database to a target database. The system repeatedly creates batches of change data capture events and sends them from the source database system to the target database system as follows.

The system initializes 620 a batch of changed data capture events. For example, the system may initialize the data structures used for storing events. The system may use a buffer for storing the events.

The system adding changed data capture events to the batch by repeating steps 630, 640, 650 for each event. The system receives 630 a change data capture event. The system evaluates 640 a sequence of prioritized constraints. The evaluation is performed in order of priority of the prioritized constraints. If all prioritized constraints of the sequence are satisfied for a change data capture event, the system adds 650 the change data capture event to the batch. A buffer 530 may be used to store events of a batch. If at least one of the prioritized constraints of the sequence fails to satisfy for a particular changed data capture event, the system completes 660 the batch, i.e., the system marks the batch as closed (or full) so that no more events are added to the batch. The system sends 670 the completed batch to the target database system using the event transmitter.

Receiving events from a source database and sending them one by one over the network results in significant overhead, for example, overhead of network transmission. Overhead of network transmission includes allocation of network buffers to hold the data and the construction of protocol headers for every individual event. This slows down the overall speed of transfer of events. Instead, the system batches events based on a multi-constraint based criterion to improve the efficiency of execution by reducing the protocol overhead and by saving on network resources.

According to an embodiment, the system processes a sequence of prioritized constraints for determining whether to declare a batch of events as complete.

According to an embodiment, the sequence of prioritized constraints includes a constraint that is satisfied if the time passed since the batch of changed data capture events was created is below a threshold value.

According to an embodiment, the sequence of prioritized constraints includes a constraint that is satisfied if the number of changed data capture events included in the batch of changed data capture events is below a threshold value.

According to an embodiment, the sequence of prioritized constraints includes a constraint that is satisfied if the aggregate size of the changed data capture events included in the batch of changed data capture events is below a threshold value.

According to an embodiment, a constraint C1 is satisfied if the time passed since the batch of changed data capture events was created is below a threshold value is higher priority than a constraint C2 that is satisfied if the number of changed data capture events included in the batch of changed data capture events is below a threshold value.

According to an embodiment, the constraint C2 that is satisfied if the number of changed data capture events included in the batch of changed data capture events is below a threshold value is higher priority than a constraint C3 that is satisfied if the aggregate size of the changed data capture events included in the batch of changed data capture events is below a threshold value.

Figure 7:
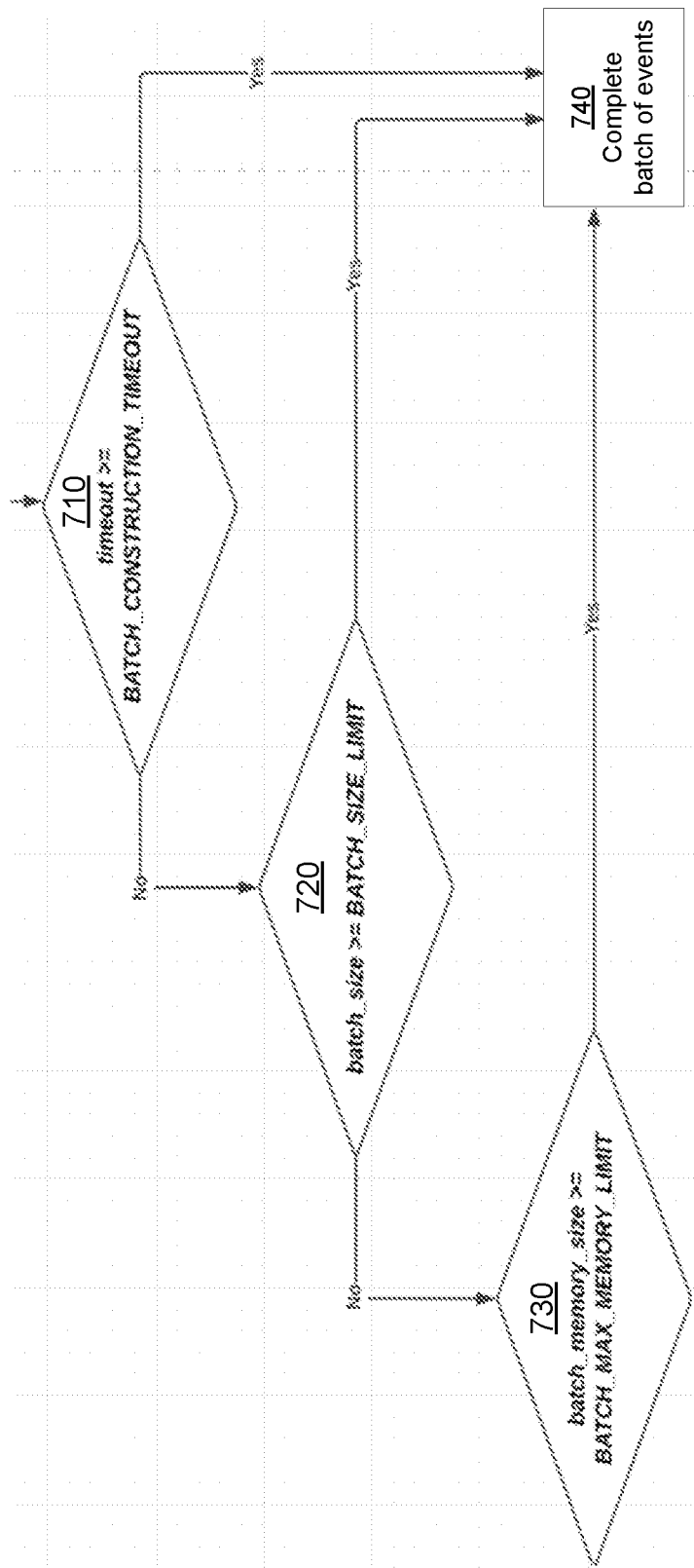
FIG. 7 is a flow chart illustrating an example evaluation of prioritized multiple constraints for event batching, according to one embodiment.

FIG. 7 is a flow chart illustrating an example evaluation of prioritized multiple constraints for event batching, according to one embodiment. The process shows various prioritized constraints 710, 720, 730 that are executed in order of their priority. If any of the prioritized constraints 710, 720, 730 fails to satisfy, the batch if completed 740 and sent to the target database system.

The constraint 710 checks if the time since the batch was initialized exceeds a timeout value specified by a parameter BATCH_CONSTRUCTION_TIMEOUT that represents the maximum wait time allowed in waiting for a batch of events to accumulate. If the batch does not reach a size limit (specified using the parameter BATCH_SIZE_LIMIT) before reaching the timeout, the system determines that the constraint is not satisfied, and the batch is considered to be closed. According to an embodiment, the system determines that the batch is completed if the current time exceeds the completion time of the last batch that was completed by a threshold amount, i.e., BATCH_CONSTRUCTION_TIMEOUT. According to an embodiment, the parameter BATCH_SIZE_LIMIT is updated continuously based on the type and size of incoming events and also feedback received from an event receiver (e.g., the target consumer or the target database system).

The constraint 720 checks if the size of the batch determined based on a number of events included in the batch exceeds a predefined size limit, for example, as specified using parameter BATCH_SIZE_LIMIT. If the batch size exceeds a threshold value specified by the parameter BATCH_SIZE_LIMIT, the system determines that the constraint 720 failed to evaluate and marks the batch complete.

The constraint 730 checks if the batch memory size exceeds a predefined threshold value specified using the parameter BATCH_MAX_MEMORY_LIMIT. The parameter BATCH_MAX_MEMORY_LIMIT represents a limit imposed on the memory allocated for all the events included in a batch so that the overall memory consumed by the batched stays under certain system limits. This constraint ensures that an arbitrary batch does not contain the majority of events with large memory thereby causing the replication process to run out of memory. According to some embodiments, the system analyzes the sizes and types of events (e.g., blob type of events, non-blob type of events, etc.) and uses the information to adjust the BATCH_MAX_MEMORY_LIMIT dynamically at runtime.

If there is a continuous stream of incoming events, the batch size may be limited by a maximum number of events determined at runtime by continuous feedback from the event receiver. This is further controlled by the amount of memory consumed by the batch. The memory consumption is tracked on a per event basis and if the batch memory consumption reached the threshold value (i.e., BATCH_MAX_MEMORY_LIMIT), then the batch is considered closed. Else, the system waits until the BATCH_SIZE_LIMIT is reached. While waiting for the BATCH_SIZE_LIMIT, a timer is started, and if the batch size is not reached until the BATCH_CONSTRUCTION_TIMEOUT parameter, then the batch is considered closed.

The values of various parameters used for specifying prioritized constraints may be adjusted dynamically based on event information that is received and analyzed by the system.

If the system limits the buffer/queue size based on the number of events i.e., the parameter BATCH_SIZE_LIMIT, there is a possibility that many large events occupy the buffer/queue. This may result in utilizing a significant amount of system memory and even exceed the total memory allocated to the extraction process. Therefore, the system limits the buffer/queue size using a memory limit BATCH_MAX_MEMORY_LIMIT. For example, if 500 MB of memory is allocated to the extraction process, the system limit the memory for buffers 530 to a fraction of the total allocated memory, for example, 10% (say) of the total allocated memory. For example, the value of the attribute BATCH_MAX_MEMORY_LIMIT may be determined as 10% of total memory allocated to extraction process, i.e., 10%×500 MB=50 MB.

For events with a low incoming rate, there may be a significant delay between the arrival of events. In such situations, the system may wait a long time to receive a fixed number of events to fill the buffer up to BATCH_SIZE_LIMIT. Therefore, the system considers the current batch closed (or completed) if the time duration since the last batch was completed exceeds a threshold interval i.e., BATCH_CONSTRUCTION_TIMEOUT.

Multi-Buffer Based Database Replication Using Change Data Capture

The system as disclosed uses multiple buffers for transmitting change data capture streams. A set of empty buffers are initialized. A buffer is selected for storing events. As events are received from the source database, the events are added to the selected buffer. When the buffer reaches capacity, another empty buffer is selected. A buffer transmitter selects a full buffer for transmitting data to the target database. The buffer transmitter keeps selecting the oldest buffer and transmitting the data to the target database. The use of multi-buffer decouples the receiving and sending of events and removes the synchronization overhead. Furthermore, the system may use multiple threads to receive and populate multiple buffers or transfer data from multiple buffers in parallel.

This approach is not limited to two buffers and can be extended to any number of buffers, e.g., n buffers. Out of n buffers, 1 to n−1 buffers are filled with events while the $n^{th}$ buffer is used for transmission of events.

Figure 8:
FIGS. 8A-B illustrate the process of switching buffers storing events for reducing contention, according to an embodiment.

FIGS. 8A-B illustrate the process of switching between two buffers storing events, according to an embodiment. The speed at which events are received by the system may be different from the speed of transmission of events via the network. According to an embodiment, the system uses at least two buffers (e.g., buffers 810A and 810B) to hold the input events. Out of the two buffers, the system uses one buffer (e.g., buffer 810A) for storing incoming events by the extraction process while the other buffer (e.g., buffer 810B) is used for transmitting events to the target database system by the event transmitter. The buffer used for storing incoming events by the extraction process may be referred to as an extraction buffer and the buffer used for transmitting events to the target database system may be referred to as the transmission buffer. The system ensures that the event extractor and event transmitter do not block or contend with each other for every event. As a result, the system minimizes contention between extraction and transmission processes.

The buffers are managed as follows. While the buffer 810A is getting filled with the events, the system transmits the events from the second buffer 810B simultaneously. Once the event transmitter has transmitted all the events of the buffer 810B, the buffer 810B is reset, i.e., reinitialized for use in storing another batch of events. When the buffer 810A is filled with the events i.e., current batch is completed, then the system checks whether transmission of the events has been completed from the buffer 810B. If transmission of the events has been completed from the buffer 810B, then the system switches the roles of the two buffers 810A and 810B, i.e., next the system uses buffer 810A for transmitting events and 810B for storing incoming events. Accordingly, the system keeps swapping the roles of the buffers 810A and 810B between a role of extraction buffer and the role of transmission buffer. The swap may occur when the transmission buffer becomes empty or when the extraction buffer becomes full. A buffer is marked as full based on the multi-constrained analysis described in FIGS. 5-7.

Figure 9:
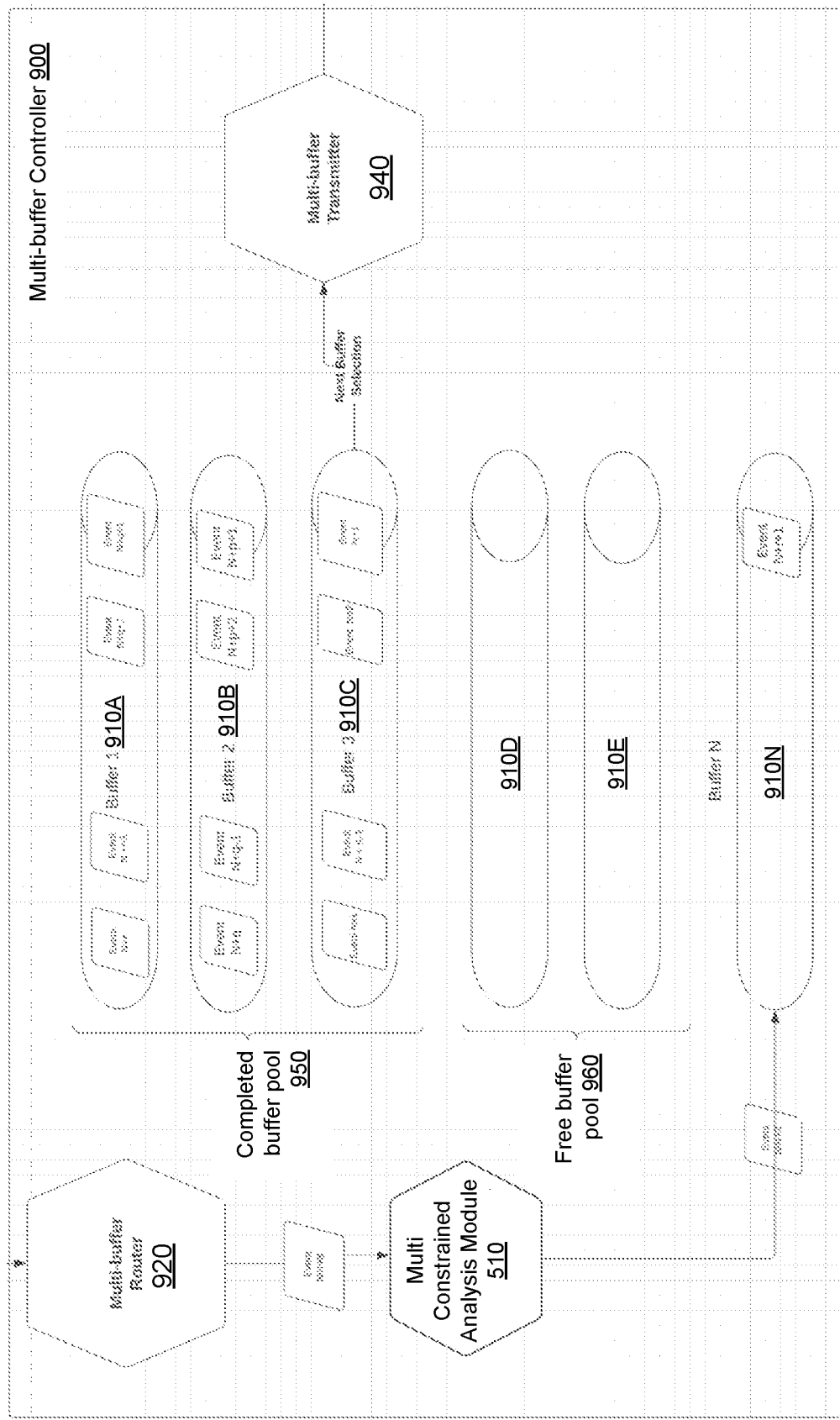
FIG. 9 illustrates the architecture of a multi-buffer controller, according to an embodiment.

FIG. 9 illustrates the process of switching between multiple buffers storing events, according to an embodiment.

The system dynamically creates batches of events based on multiple constraints and continuous feedback regarding the future batch size. The constraints are applied in a priority order to create batches of events. The system separates the extraction and transmission processes with multiple shared buffers controlled by a Multi-Buffer Controller (MBC). The system uses the multi-buffer controller (MBC) 900 to allocate multiple buffers dynamically to hold the input events subjected to the multi-constraint analysis (MCA) module 510. The multi-buffer controller includes a multi-buffer router 920 that determines which buffer is used to store an incoming event. The multi-constrained analysis module 510 may be part of the multi-buffer controller 900 or may be a separate module invoked by the multi-buffer controller 900.

The system uses a completed buffer pool 950 of buffers 910A, 910B, . . . , 910C marked as completed based on the multi-constrained analysis. According to an embodiment, the completed buffers sorted on the completion timestamp. The system also uses a free buffer pool 960 including buffers 910D, 910E, . . . , 910N that are either empty or buffers that may not be empty but are not yet marked as full.

Initially, all the allocated memory for event buffering is added to buffers of the free buffer pool 960. The multi-buffer controller 900 starts allocating buffers from free buffer pool 960 to buffer incoming change data capture events in batches. Each batch of events is stored in a single buffer. The system may create N buffers. All the N buffers may not be of the same size; N may not be a constant; and N=2. Out of N buffers allocated, N−1 buffers are used to buffer incoming events, while the events from $N^{th}$ buffer are being transmitted by the multi-buffer transmitter 940.

The multi-buffer router 920 routes an incoming event to the appropriate buffer. The multi-buffer router 920 starts filling buffers one by one by applying the multi-constraint analysis. When a buffer is determined to be full based on the multi-constrained analysis, the buffer is closed and is moved to the completed buffer pool 950. Each completed buffer is associated with a completion timestamp. If there are no buffers available in the free buffer pool 960, the system waits for a buffer to become available.

The multi-buffer transmitter 940 is responsible for choosing a buffer from the completed buffer pool 950 for transmission. According to an embodiment, the multi-buffer transmitter 940 selects the oldest buffer from the completed buffer pool 950 for transmission. The selection is based on the completion timestamp associated with the buffers. Out of all the completed buffers, the system selects the completed buffer with the oldest timestamp. If the completed buffer pool 950 is empty, the system waits until a completed buffer is available. Once a buffer is transmitted, the system resets the buffer and returns the buffer to the free buffer pool 960.

Figure 10:
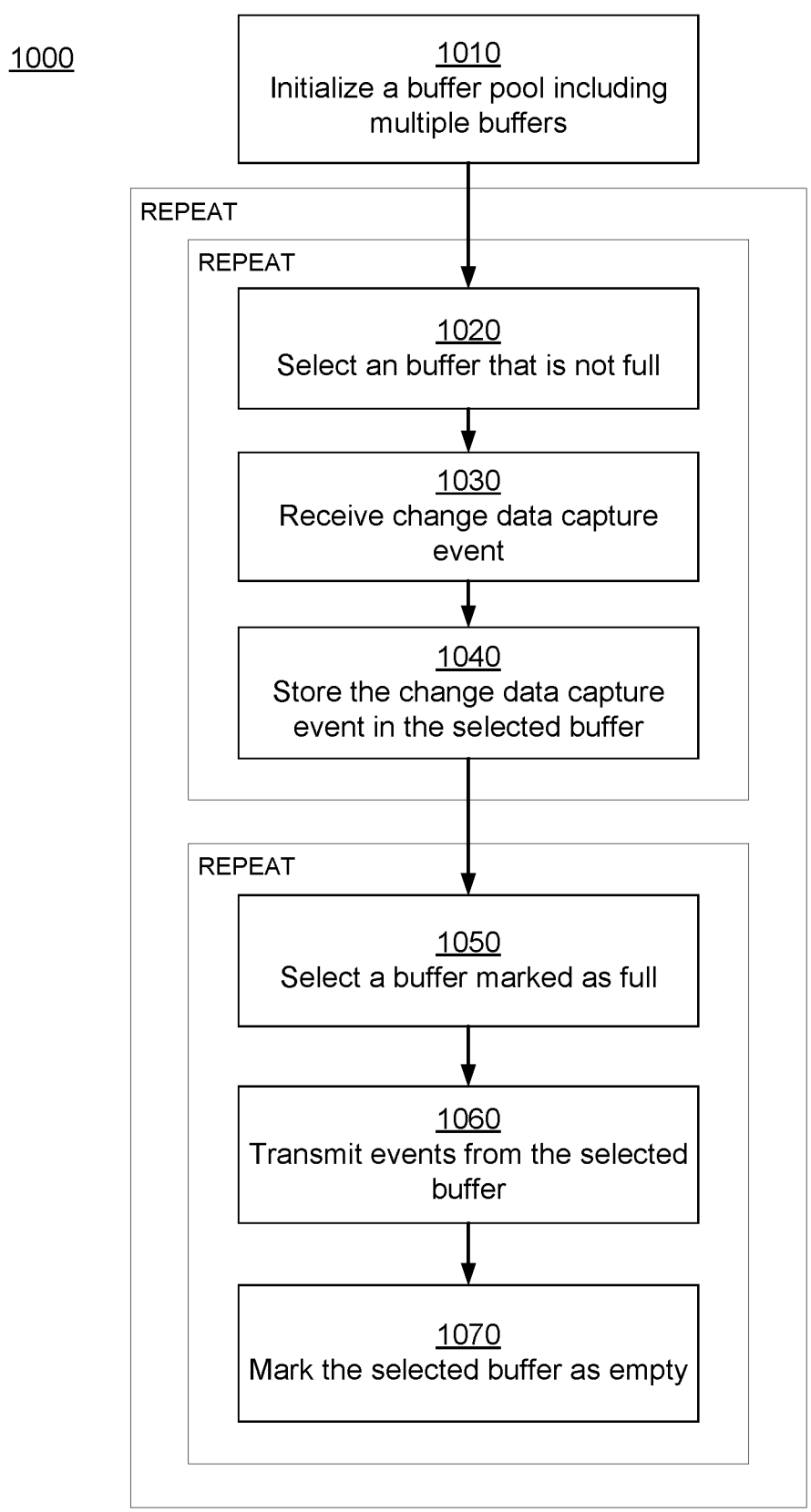
FIG. 10 is a flow chart illustrating the process for switching buffers to reduce contention, according to one embodiment.

FIG. 10 is a flow chart illustrating the process 1000 for switching buffers to reduce contention, according to one embodiment. The system manages multiple buffers for transmitting events from one system to another, for example, for transmitting change data capture events during database replication. The steps shown in the flowchart may be executed in an order different from that indicated in FIG. 10. For example, the receiving and transmitting steps may be executed in parallel.

The system receives a request to replicate a source database system to a target database system. The system initializes 1010 a buffer pool by allocating multiple buffers. Each buffer is configured to store change data capture events for transmission from the source database system to the target database system. As part of the initialization, the system marks buffers of the buffer pool as empty.

The system performs receiving and transmitting of change data capture events in parallel, by repeating the following steps.

The system receives change data capture events by repeatedly performing the steps 1020, 1030, and 1040. The system selects 1020 a buffer marked as empty from the buffer pool.

Alternatively, the system may select any buffer that is not marked as full. The system receives 1030 change data capture events from source database system. The system stores 1040 the received change data capture events in the selected buffer. The system receives 1030 and stores 1040 the change data capture events in the selected buffer the until the selected buffer is full. According to an embodiment, a buffer is determined to be full (or complete) based on the multi-constraint analysis as illustrated in FIGS. 5-7.

The system transmits change data capture events by repeating the steps 1050, 1060, and 1070. The system selects 1050 a buffer marked as full (or completed) from the buffer pool. The system selects change data capture events from the selected buffer and transmits 1060 the selected change data capture events to the target database system until the selected buffer is empty. The system marks 1070 the selected buffer as empty and makes the buffer available for receiving change data capture events according to steps 1020, 1030, and 1040.

The multi-buffer controller separates the buffers being transmitted from the buffer being used for event extraction increases the performance of database replication significantly. The multi-buffer controller reduces contention between the extraction Process and the transmission Process Multi-Tenant Database Replication Based on Dynamic Tenant Scores Several applications, for example, cloud-enabled applications require the schema to be generic to accommodate multiple tenants. Accordingly, the schema does not vary from tenant to tenant. Such applications use a generic schema with wide tables to accommodate all tenants. As a result, in a multi-tenant cloud database, the schemas are created in such a way that they are applicable to multiple tenants. According to an embodiment, a multi-tenant system creates a schema for cloud applications, having tenant_id as one of the columns in the schema. This column is typically used in tables where tenant-specific data is stored.

Multi-tenant systems typically migrate a subset of tenants from a source database system to a target database system. The multi-tenant system cannot perform replication of the entire source database to the target database since the source database may have sensitive data for other tenants that have not requested the migration. The system according to an embodiment addresses this issue by performing replication of multi-tenant databases for one or more tenants using a tenant score-based approach.

Replicating data for a specific set of tenants requires processing a large number of DML events and filtering them based on tenant_id. The process of filtering them based on tenant_id is performed by intercepting the tenant_id column for the event, and subsequently assigning the record to the appropriate tenant-specific buffer. Also, batching the optimal number of events for each tenant can be an issue as there may be limited system memory. The batching in the multi-tenant cases requires tracking and adjusting multiple tenant buffers to limit the overall memory utilized by the system. Also, the tenant-specific batches of events need to be transmitted to consumers frequently. Conventional multi-tenant database replication techniques run into several issues. Typically, the replication is run separately for each tenant. This is time-consuming and requires a lot of computing resources to be provisioned in the cloud repeatedly for each tenant. As a result, such approaches are not scalable.

The system according to various embodiments, performs batching to group events generated by the change data capture events and uses multiple buffers to transmit the data for multiple tenants. The system creates multiple event transmitters, one per tenant. An event transmitter is paired with a destination event consumer. A tenant score is computed at the end of each batch completion based on various metrics based on events received, e.g., statistics describing LOB (large object) data events and non-LOB data events. The system adjusts the resources allocated during event transfer based on scores determined for each tenant.

Figure 11:
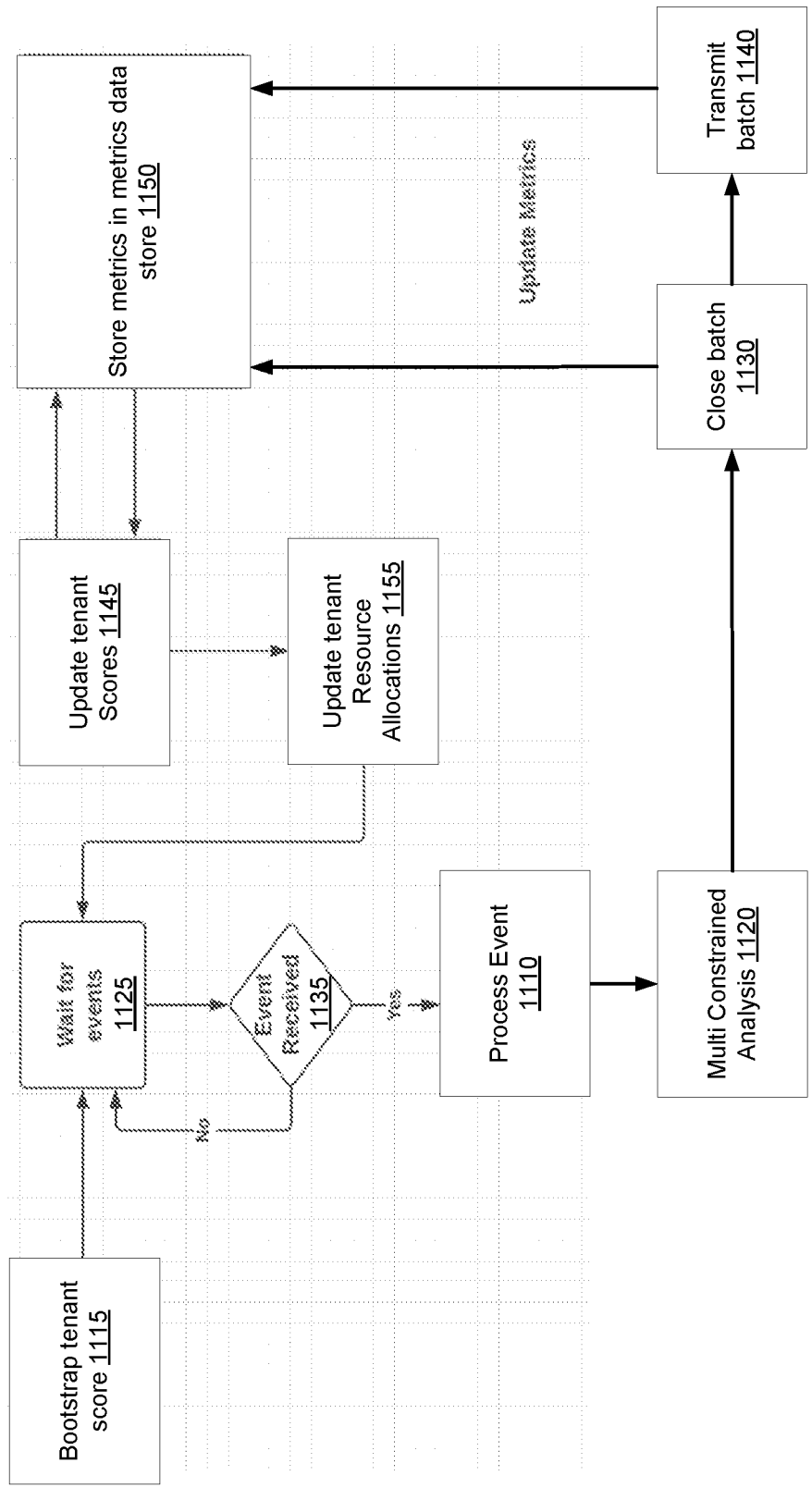
FIG. 11 is a block diagram illustrating the use of tenant scores for batching events in a multi-tenant system, according to an embodiment.

The tenant score may depend on the relative size of a tenant w.r.t other tenants being replicated. The tenant score determines the amount of resources allocates for a tenant. The tenant score is dynamically determined, for example, the tenant score may be computed at the end of each batch FIG. 11 is a block diagram illustrating the use of tenant scores for batching events in a multi-tenant system, according to an embodiment. The tenant score is determined based on various factors including a quantitative measure of the relative size of a particular tenant with respect to other tenants. A tenant with a higher score is allocated more resources during replication. At event extractor, the system configures the number of tenants are to be replicated, for example, using a configuration parameter. Multiple event transmitters are created, for example, one per tenant. An event transmitter is paired up with a destination event consumer at the beginning of replication (or Change Data Capture (CDC)). At the beginning of CDC, the system performs initial analysis to determine the initial bootstrap scores of each tenant. The system bootstraps 1115 tenant score of a tenant based on the amount of data to be replicated and the no. of DML events per sec at the source database for the tenant. This initial bootstrap scores is used at the beginning of the replication.

At the bootstrap of replication, the scores for various tenants being replicated are assigned based on certain parameters such as: (1) tenant_data_size representing the total size of the tenant data in the source DB to be replicated, and (2) events_per_sec representing the rate of events, for example, the number of incoming events per second for the tenant at the source database system. These parameters are normalized to a score and the total score is determined as the sum (or weighted sum) of all individual scores. The system uses the total score as an estimate of the total resources to be allocated initially.

The system extracts database logs to retrieve the events_per_sec parameter. For example, for each 0.5 TB of tenant data, 1 point may be assigned (after rounding off to the nearest decimal). And, for every 500 events/sec, 5 points may be assigned (after rounding off to the nearest decimal). Accordingly, the system uses the tenant's size of data to allocate resources for each tenant in a proper proportion. If a system allocates an equal amount of resources for all tenants, the system may be underutilized for some tenants whereas some tenants are starved due to lack of resources.

Following table shows example, scores used for bootstrapping.

| Tenant | tenant_ data_ size (TB) | score_ for _ data_ size | events_ per_ sec | score_ for_ events | tenant_score = score_for_data_ size + score_for_events |
|---|---|---|---|---|---|
| A | 0.5 | 1 | 3800 | 40 | 41 |
| B | 0.6 | 1 | 1200 | 10 | 11 |
| C | 1.2 | 2 | 2400 | 20 | 22 |
| D | 5 | 10 | 1600 | 20 | 30 |
| E | 10 | 20 | 2500 | 30 | 50 |
| Total | 17.3 | 34 | 11500 | 120 | 154 |

At runtime, the tenant score is computed at the end of each batch completion. And, the value of the tenant score may vary during the course of replication for a tenant. The tenant score for a tenant is based on a set of metrics that are computed and updated in the metric store at the end of each batch. An observability module tracks the metrics for each tenant. Example metrics stored in the metric store that are used to compute tenant score are lob_data_events_sec representing rate of lob data events received (lob data events per second), avg_lob_event_size_kb representing average lob event size (e.g., in kilo bytes), non_lob_data_events_sec representing rate of non-lob data events received (non-lob data events per second), non_lob_event_size_kb representing average non-lob event size (e.g., in kilo bytes), and so on.

From these metrics, the system determines tenant scores as follows. The system may determine two scores. A lob score and a non-lob score values are determined as follows. The lob score is determined as a product of lob_data_events_sec and avg_lob_event_size_kb normalized using a normalization factor, e.g., 1/100000. The non-lob score is determined as a product of non_lob_data_events_sec and avg_non_lob_event_size_kb normalized using a normalization factor, e.g., 1/100000.

$$lob\_score = lob\_data\_events\_sec \times avg\_lob\_event\_size\_kb/100000$$

$$non\_lob\_score = non\_lob\_data\_events\_sec \times avg\_non\_lob\_event\_size\_kb/100000$$

Other embodiments may use other ways of computing tenants scores so long as the resultant tenat_score reflects the relative sizes of tenants. For example, tenant E (below) is having a large average lob size and moderate no. of incoming events. However, this tenant requires the processing of large data per second when compared to other tenants. So, the normalization factor should reflect the same in the tenant's lob_score.

For each tenant, the resources are allocated based on the tenant score. For each tenant, the system tracks the resource usage. The tracking process ensures that the total resource utilized by each tenant is under the allocated resource limits. Based on allocated resources, events are buffered and subjected to multi-constraint analysis for each tenant. An observability manager may run in a separate thread. This thread maintains an in-memory data store for all the system-wide metrics. At the end of each batch, the metrics discussed herein are updated in the metric data store. Once the batch is closed and transmitted, there is an update of the metrics in the metrics datastore.

Before the beginning of the next batch for a tenant, the tenant resources are readjusted based on the metrics from the metric datastore. For example, the buffer size can be allocated for a tenant based on its score as below. The tenant buffer size is determined based on a product of an estimate of the total application buffer size and the tenant score and the product divided by the total score, where total_score is the sum of the scores of all tenants.

$$tenant\_buffer\_size = total\_application\_buffer\_size * tenant\_score / total\_score,$$

Figure 12:
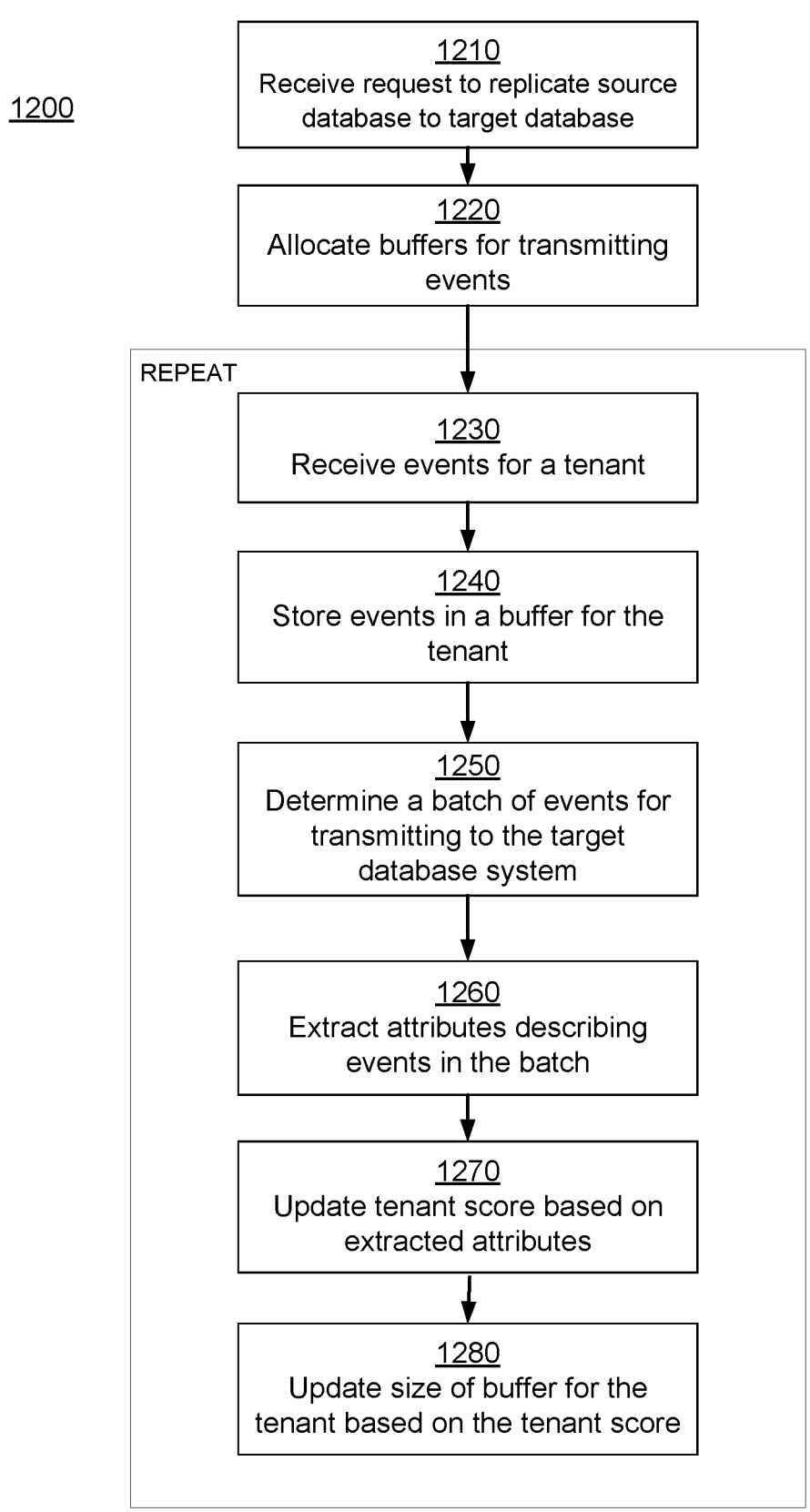
FIG. 12 is a flow chart illustrating the process of performing batching based on tenant scores in a multi-tenant system, according to one embodiment.

FIG. 12 is a flow chart illustrating the process 1200 of performing batching based on tenant scores in a multi-tenant system, according to one embodiment.

The system, for example, multi-tenant system receives 1210 a request to replicate a source database system to a target database system. The system allocates 1220 a plurality of buffers for transmitting change data capture events from the source database system to the target database system. Each buffer is associated with a tenant of the multi-tenant system. The system sends batches of change data capture events from the source database system to the target database system by repeatedly performing the steps 1230-1280.

| Tenant | B = Lob_data_events_sec | C = avg_lob_event_size_kb | D = lob score = (B * C)/100000 | E = non_lob_data_events_sec | F = avg_non_lob_event_size_kb | G = non-lob score = (E * F)/100000 | tenant_score = (D + G) |
|---|---|---|---|---|---|---|---|
| A | 1800 | 1000 | 18 | 1750 | 2 | 0.035 | 18 |
| B | 1100 | 350 | 3.85 | 500 | 3 | 0.015 | 4 |
| C | 200 | 800 | 1.6 | 2000 | 1 | 0.02 | 2 |
| D | 500 | 2000 | 10 | 1500 | 4 | 0.06 | 10 |
| E | 700 | 3500 | 24.5 | 2200 | 2 | 0.044 | 25 |
| Total | 4300 | 7650 | 57.95 | 7950 | 12 | 0.174 | 59 |

The system determines a total score as the sum of all the individual tenant scores. In the example data in the above table total_score=59. The system determines the resources allocated to each tenant based on a ratio of the tenant score for the tenant and the total tenant score value. Accordingly, the system determines tenant_score/total_score to determine the fraction of resources to be allocated for a tenant.

As shown in FIG. 11, the system waits 1125 for events and receives 1135 events. The system processes 1110 a received event, for example, to transform the information based on the target database system. The system performs 1120 multi-constrained analysis of the event to build the batch. The batch is closed 1130 based on the multi-constrained analysis. The batch is transmitted 1140 to the target database system. The system determines and stored 1150 metrics describing the batched in a metrics data store. The system periodically updates 1145 the tenants scores based on the metrics stored in the metrics store. The system updates 1155 the tenant resource allocations based on the updated tenant scores.

The system receives 1230 changed data capture events for a tenant. The system stores 1240 the received changed data capture events in a buffer associated with the tenant. The system determines 1250 a batch of changed data capture events stored in the buffer associated with the tenant for transmitting to the target database system. For example, the batch may be determined based on a multi-constraint analysis. The system extracts 1260 attributes describing the change data capture events, for example, size and number of change data capture events in the batch. The system updates 1270 the tenant score based on the extracted attributes. The system updates 1280 the size of buffer associated with the tenant based on the updated tenant score.

Asynchronous Processing of Events During Database Replication

During replication of a source database to a target database, change data capture events are generated representing changes in the source database. An event has multiple attributes that are used by different subsystems, for example, a subsystem for generating metrics, a subsystem for performing data transmission, and so on. The dependency of an event on multiple subsystems causes synchronization overhead since a subsystem gets blocked if the remaining subsystems do not complete processing.

The system as disclosed allows asynchronous processing of tasks based on events. This results in decoupling of tasks and reduces synchronization overhead. The system splits an event into partial events, each partial event including a subset of attributes of the event. Accordingly, the attributes of an event are divided such that there is no dependency between the partial events and the tasks can be executed independent of each other. A data flow analysis may be performed to determine how to split the attributes of the event, for example, to determine which attributes of the event are processed by a particular subsystem so that the event can be split accordingly.

Figure 13:
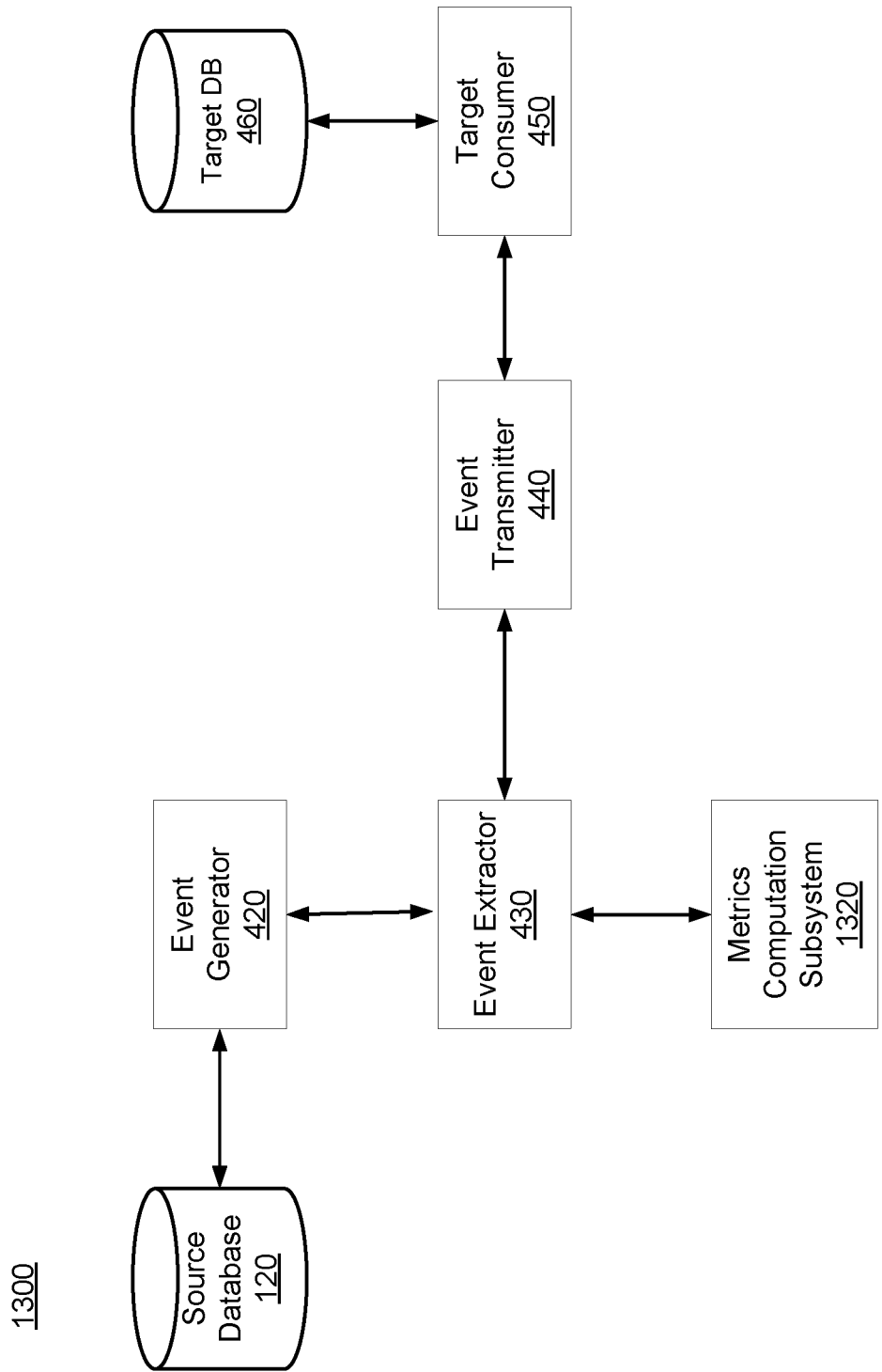
FIG. 13 illustrates the various components and their interactions during database replication according to an embodiment.

FIG. 13 illustrates the various components (or subsystems) and their interactions 1300 during database replication according to an embodiment. In a database replication system, a database event traverses synchronously through all the subsystems until the event finishes its life cycle. The subsystems may include subsystems with instructions for extraction, transmission, observability. As shown in FIG. 13, the event is generated based on DML operations of the source database 120 by the event generator 420. The event generator 420 interacts with the event extractor 430 allowing the event extractor 430 to extract the generated events. The event extractor interacts with the metrics computation subsystem 1230 for generating and storing various metrics used for analysis of the events, for example, to generate scores used by the system such as the tenant score. The metrics computation subsystem 1320 may include modules for computing each metric and storing it in a metrics data store. The event extractor 430 further interacts with the event transmitter 440 to transmit the events to the target database 460. The event transmitter 440 interacts with the target consumer 450 to make changes to the target database 460 based on the events. The event transmitter is also referred to herein as the event transmission subsystem.

An event may spend a significant amount of time in all the above subsystems. Once an event lifecycle ends, the next event is entered into the system. This synchronous processing delays the processing of events, and the overall database replication latency is impacted significantly due to some unnecessary operations performed in the context of an event.

Once an Event is extracted with all the details, the extraction process is ready for the next event. But, due to various processes like transmission & metrics datastore updates involved with the synchronous processing of an event, it is possible to extract the next event immediately because extraction of the next event may corrupt the event buffers and the system may crash.

As illustrated in FIG. 13, there is a significant processing overhead in the synchronous processing of an event. The event extractor 430 performs both event transmission and metrics computation operations. The system according to an embodiment separates out transmission and metrics computation operations from the extraction process. This results in reducing the synchronization overhead for each event and significantly improves the processing of events. This significantly improves the overall performance of the database replication process.

The system performs event splitting and partial cloning of events to reduce synchronization overhead of events to perform low-latency database replication. An event contains various data elements (or data attributes) such as event type, event data (e.g., buffers containing data that can occupy significant memory), event metrics (e.g., extraction latency, data size and other metrics for each event), event return code, and so on.

Once an event is received by the extraction system, the extraction process extracts the necessary data for the event. During extraction, the extraction process keeps track of metrics such as latency involved in retrieving the event data, total data size extracted for the event, and event return code to be sent to the event source, and so on.

Figure 14:
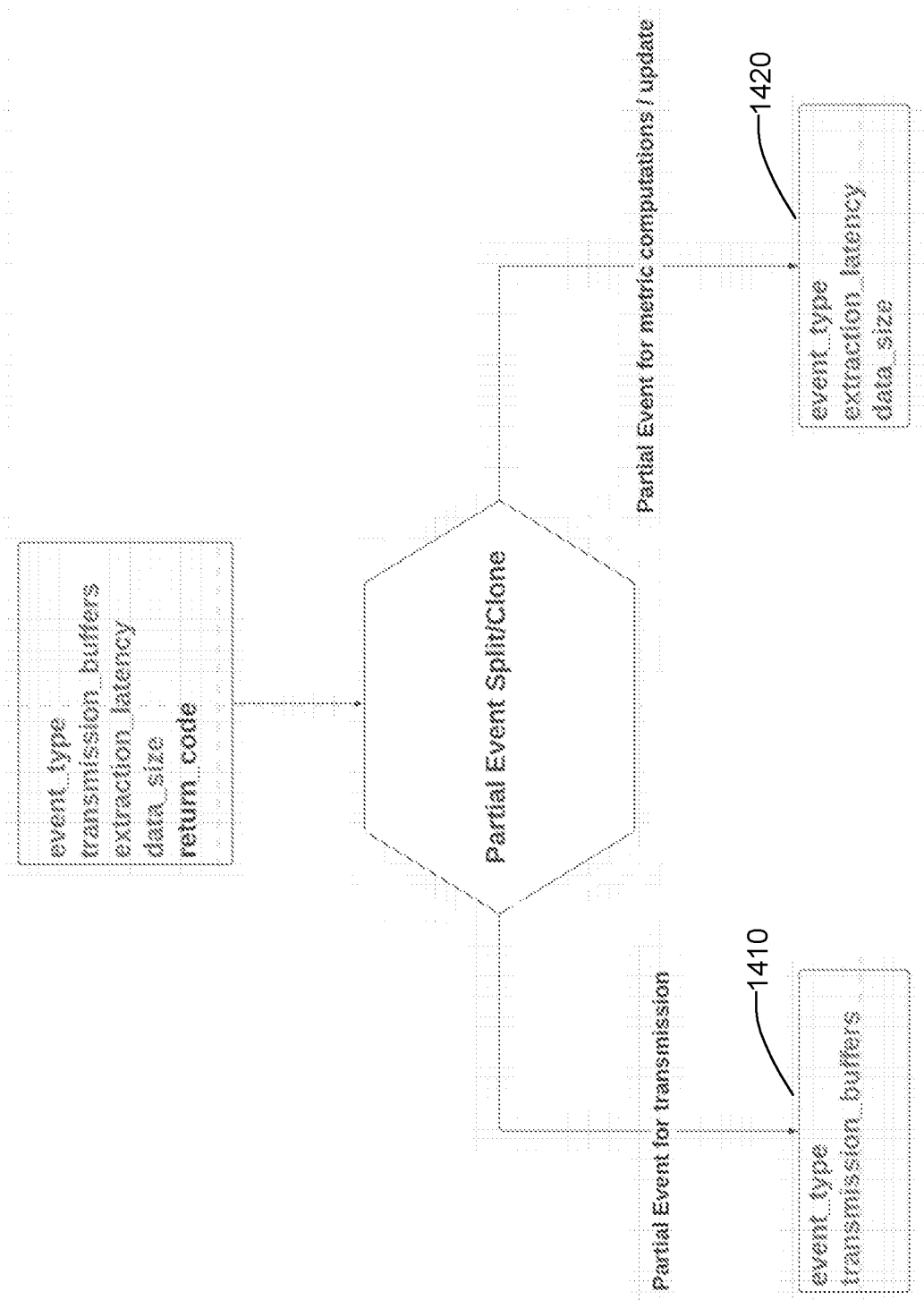
FIG. 14 illustrates splitting of an event into multiple events according to an embodiment.

To reduce the synchronization overhead, the system splits the original event into a plurality of partial events. Each partial event is processed independently as an event. FIG. 14 illustrates splitting of an event into multiple events according to an embodiment. For example, each original event extracted from the source database may be split into two partial events: a partial event 1410 for transmission to event consumer and a partial event 1420 for metrics computation.

After cloning the event, the event extractor 430 that executes an extraction thread completes the extraction of the event. The event extractor 430 provides the extracted partial events 1410 and 1420 to the event transmitter and metrics computation subsystems. After splitting the event into partial events and providing them to their respective components (or subsystems), the event extractor 430 determines that the event extraction process is complete. As a result, the event extractor 430 does not wait for the transmission subsystem and metrics subsystem to complete their processing of their respective partial events. This reduces the synchronization overhead between the subsystems. The event extractor 430 returns the SUCCESS/FAILURE code back to the event source (e.g., the event generator 420) and is ready to receive and process the next event that is provided by the event source.

Once the event extraction is completed for the event, the is buffered for transmission. Since the event transmission is independent of even extraction, the system processes instructions of event transmission independent of the instructions of event extraction without blocking the extraction subsystem (e.g., event extractor 430) from retrieving subsequent events.

The system clones the original event partly/selectively cloned to a partial event 1410 for transmission. The cloned event contains only the data required for transmission (for example, data fields and buffers, etc. required for transmission). In the original event, the transmission buffers are cleared and only a subset of the attributes such as the event type, event metrics, and event return code is remaining. The cloned event is placed into the respective transmission buffer for the tenant. This makes the extraction and transmission subsystems independent of each other.

Furthermore, the metrics computation is an independent process that should not block the event extraction process because the metrics computation results in significant processing overhead and eventually delays the event extraction process. Therefore, the system further clones the event into a partial event 1420 that includes a subset of event attributes including metrics data while excluding other event attributes not relevant to metrics computation. The partial event 1420 created for metrics computation is placed into a queue of the metrics computation subsystem, for example, a component observability manager. the observability manager component of the metrics computation subsystem processes the event to update metrics based on the event and stores the updated metrics into the metrics datastore. This makes the extraction and metrics computation independent of each other.

According to an embodiment, the system performs data flow analysis to determine subsets of event attributes that are processed by different subsystems to determine how an event is split. The system may statically analyze the instructions of specific subsystems, for example, the various values passed to the subsystem during processing of events. The system identifies individual event attributes that are processed by each subsystem and determines the structure of a partial event that needs to be created for that subsystem. The system creates a plurality of partial events, each partial event including the subset of attributes identified for a particular subsystem.

Figure 15:
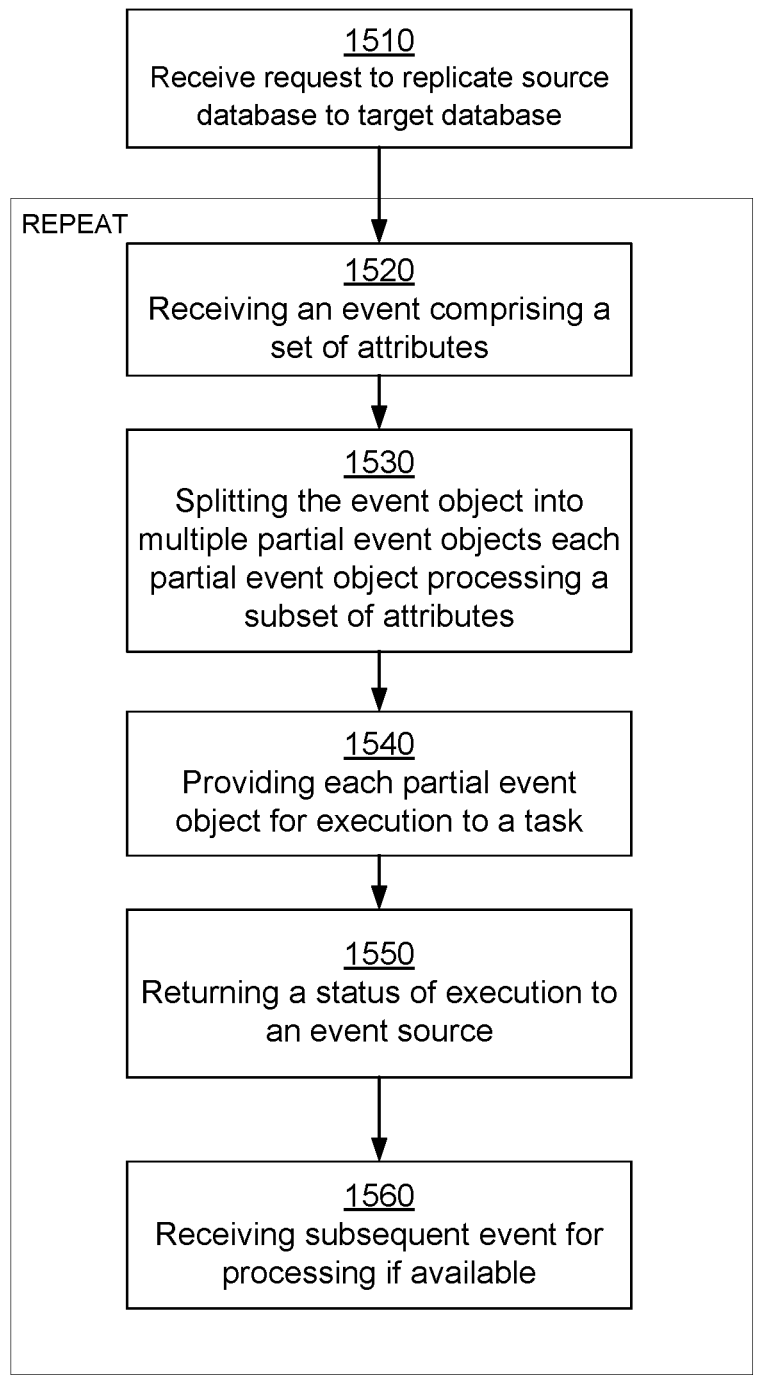
FIG. 15 is a flow chart illustrating the process of processing events by splitting events, according to one embodiment.

FIG. 15 is a flow chart illustrating processing 1500 of events by splitting events, according to one embodiment.

The system receives 1510 a request to replicate a source database system to a target database system. The system generates and sends a change data stream from the source database system to the target database system. The change data stream comprises events representing operations performed by the source database system, the sending comprising:

The system receives 1520 an event represented as an event object comprising a set of attributes. The system executes multiple tasks based on the event, including, (1) a transmission task T1 for sending a subset S1 of the set of attributes to the target database system, and (2) a second task T2 processing a subset S2 of the set of attributes. The second task T2 may be the task for calculating or updating metrics based on the event and storing the metrics in the metrics database but could be any other task based on the event.

The system splits 1530 the event object into a partial event object P1 including the subset S1 of attributes and a partial event object P2 including the subset S2 of attributes. The system provides 1540 each partial event object to the task for which the partial event was generated. For example, the partial event object P1 is sent to the task T1 and the partial event object P2 is sent to the task T2.

The system executes the tasks using the partial event objects. The system executes the second task T2 in parallel with execution of the transmission task T1. The transmission task T1 sends the partial event object P1 to the target database system and a process or a subsystem executes the task T1.

The system returns 1550 a status of execution, e.g., SUCCESS/FAILURE to the event source based on the completion of the splitting of the event into partial events and providing of the partial events to the tasks. The system receives 1560 a subsequent event from the event source for processing.

The system is able to receive and start processing of another event as soon as the event object is split into two partial event objects and does not have to wait for the processing of the transmission task T1 and the second task T2 to complete. This significantly reduces the synchronization overhead between the subsystems, thereby processing the database replication efficiently.

Computer Architecture

Figure 16:
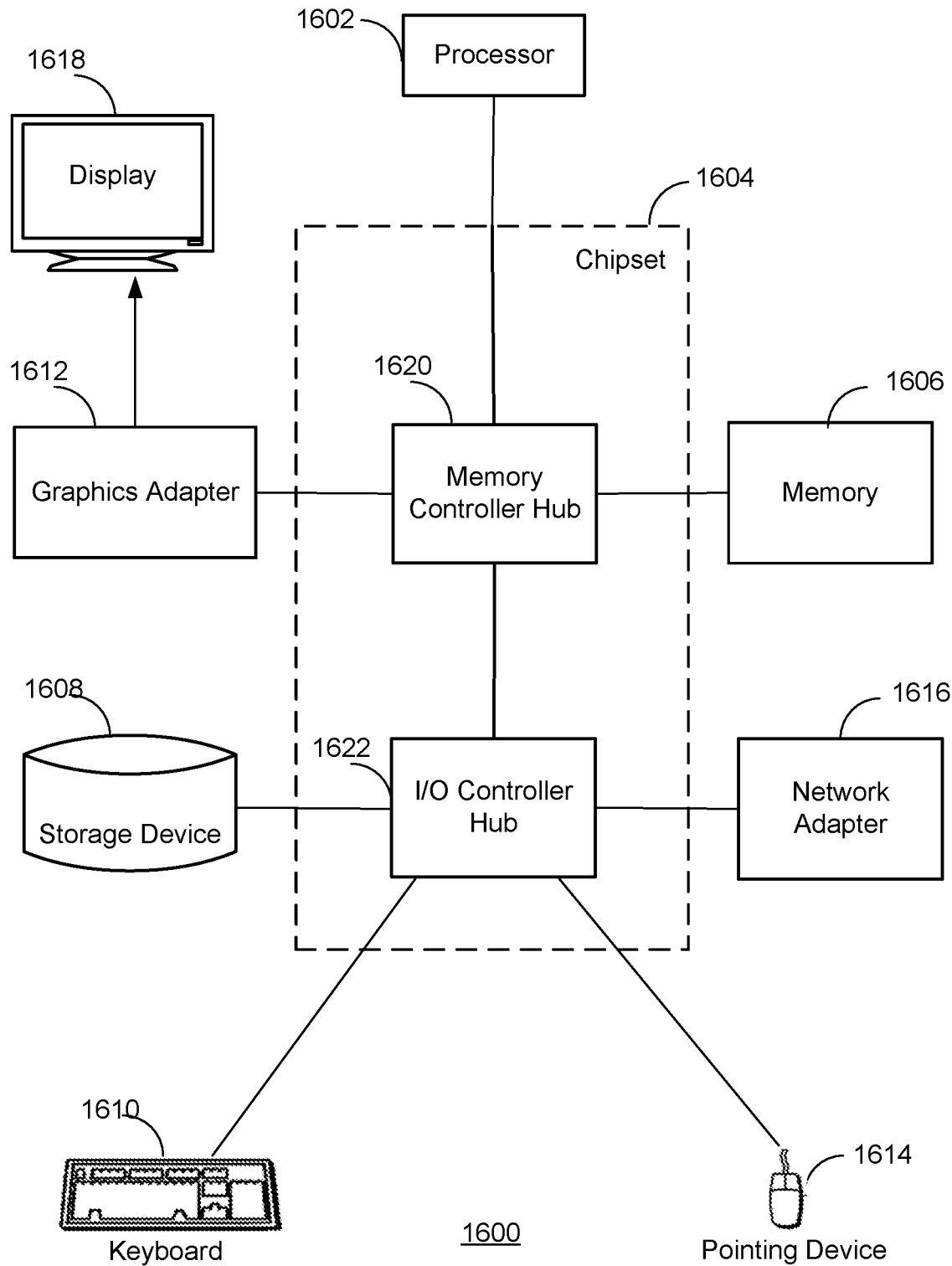
FIG. 16 is a block diagram illustrating a functional view of a typical computer system for use in the system environment, according to one embodiment.

FIG. 16 is a high-level block diagram illustrating a functional view of a typical computer system for use as one of the entities illustrated in the environment 100 of FIG. 1 according to an embodiment. Illustrated are at least one processor 1602 coupled to a chipset 1604. Also coupled to the chipset 1604 are a memory 1606, a storage device 1608, a keyboard 1610, a graphics adapter 1612, a pointing device 1614, and a network adapter 1616. A display 1618 is coupled to the graphics adapter 1612. In one embodiment, the functionality of the chipset 1604 is provided by a memory controller hub 1620 and an I/O controller hub 1622. In another embodiment, the memory 1606 is coupled directly to the processor 1602 instead of the chipset 1604.

The storage device 1608 is a non-transitory computer-readable storage medium, such as a hard drive, compact disk read-only memory (CD-ROM), DVD, or a solid-state memory device. The memory 1606 holds instructions and data used by the processor 1602. The pointing device 1614 may be a mouse, track ball, or other type of pointing device, and is used in combination with the keyboard 1610 to input data into the computer system 200. The graphics adapter 1612 displays images and other information on the display 1618. The network adapter 1616 couples the computer system 1600 to a network.

As is known in the art, a computer 1600 can have different and/or other components than those shown in FIG. 16. In addition, the computer 1600 can lack certain illustrated components. For example, a computer system 1600 acting as an online system 110 may lack a keyboard 1610 and a pointing device 1614. Moreover, the storage device 1608 can be local and/or remote from the computer 1600 (such as embodied within a storage area network (SAN)).

The computer 1600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1608, loaded into the memory 1606, and executed by the processor 1602.

The types of computer systems 1600 used by the entities of FIG. 1 can vary depending upon the embodiment and the processing power used by the entity. For example, a client device 105 may be a mobile phone with limited processing power, a small display 1618, and may lack a pointing device 1614. The online system 110 in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A method for replicating databases, the method comprising:
   receiving a request to replicate a source database system to a target database system;
   sending a change data stream from the source database system to the target database system, the change data stream comprising events corresponding to database operations performed by the source database system to be applied to the target database system;
   wherein the sending comprises:
      receiving an event object corresponding to a given database operation, wherein the event object comprises a set of attributes describing an event;
      executing a plurality of tasks based on the event object, the plurality of tasks including:
         a transmission task for sending a first subset of the set of attributes to the target database system, wherein the first subset of attributes is usable by the target database system to apply changes caused by the given database operation, and
         a second task processing a second subset of the set of attributes;
      splitting the event object into a first partial event object including the first subset of attributes and a second partial event object including the second subset of attributes; and
      executing the second task in parallel with execution of the transmission task, the transmission task sending the first partial event object to the target database system.

2. The method of claim 1, wherein the event object is received from an event source, the method further comprising:
   sending a status code representing status of execution of processing of the event object to the event source.

3. The method of claim 2, further comprising:
   responsive to sending the status code, receiving a subsequent event object for processing.

4. The method of claim 1, further comprising:
   performing an initial bulk copy of data from the source database system to the target database system before sending batches of changed data capture events.

5. The method of claim 1, wherein the second task comprises determining a set of metrics based on the second partial event object.

6. The method of claim 5, wherein the set of metrics comprises one or more metrics based on large object (LOB) events, wherein a LOB event processes at least a LOB attribute.

7. The method of claim 5, wherein the set of metrics comprises one or more metrics based on non-large object (LOB) events, wherein a non-LOB event processes attributes that are not LOB.

8. The method of claim 5, further comprising:
   determining a size of a buffer used for storing event objects based on the set of metrics, the buffer used for storing event objects that are being transmitted to the target database system.

9. The method of claim 5, wherein the source database system stores data for a multi-tenant system, wherein the set of metrics are used for determining a tenant score for a tenant of the multi-tenant system, wherein the tenant score is used for determining an amount of resources allocated for the tenant.

10. The method of claim 1, further comprising:
    performing data flow analysis of requests made to one or more subsystems processing events of the change data stream to determine a subset of attributes processed by a particular task.

11. The method of claim 1, wherein the first subset of attributes includes an attribute representing transmission buffers for storing events being transmitted.

12. The method of claim 1, wherein the second subset of attributes includes an attribute representing the data size of the event object.

13. The method of claim 1, wherein the transmission task generates a batch of event objects for transmitting, the method further comprising:
evaluating a sequence of prioritized constraints based on attributes describing an events for determining whether to complete the batch of events and transmit the batch of events.

14. The method of claim 13, further comprising:
responsive to all prioritized constraints of the sequence of prioritized constraints being satisfied, adding the event object to the batch of events.

15. The method of claim 13, further comprising:
responsive to at least one prioritized constraints of the sequence of prioritized constraints failing to satisfy for a particular changed data capture event, completing the batch of event object.

16. A non-transitory computer readable medium having program instructions stored thereon that are capable of causing a computing system to implement operations comprising:
receiving a request to replicate a source database system to a target database system; and
sending a change data stream from the source database system to the target database system, the change data stream comprising events corresponding to database operations performed by the source database system to be applied to the target database system;
wherein the sending comprises:
receiving an event object corresponding to a given database operation, wherein the event object comprises a set of attributes describing an event;
executing a plurality of tasks based on the event object, the plurality of tasks including:
a transmission task for sending a first subset of the set of attributes to the target database system, wherein the first subset of attributes is usable by the target database system to apply changes caused by the given database operation, and
a second task processing a second subset of the set of attributes;
splitting the event object into a first partial event object including the first subset of attributes and a second partial event object including the second subset of attributes; and
executing the second task in parallel with execution of the transmission task, the transmission task sending the first partial event object to the target database system.

17. The non-transitory computer readable medium of claim 16, wherein the second task comprises determining a set of metrics based on the second partial event object.

18. The non-transitory computer readable medium of claim 17, wherein the set of metrics comprises one or more metrics based on large object (LOB) events, wherein a LOB event processes at least a LOB attribute.

19. The non-transitory computer readable medium of claim 17, wherein the operations further comprise:
determining a size of a buffer used for storing event objects based on the set of metrics, the buffer used for storing event objects that are being transmitted to the target database system.

20. The non-transitory computer readable medium of claim 17, wherein the source database system stores data for a multi-tenant system, wherein the set of metrics are used for determining a tenant score for a tenant of the multi-tenant system, wherein the tenant score is used for determining an amount of resources allocated for the tenant.

* * * * *